United States Patent
Kobayashi et al.

(10) Patent No.: US 8,108,115 B2
(45) Date of Patent: Jan. 31, 2012

(54) VEHICLE CONTROL DEVICE

(75) Inventors: Yasuhiko Kobayashi, Anjo (JP); Yasuo Yamaguchi, Anjo (JP); Shinichi Nomura, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 772 days.

(21) Appl. No.: 12/245,936

(22) Filed: Oct. 6, 2008

(65) Prior Publication Data

US 2009/0105918 A1     Apr. 23, 2009

(30) Foreign Application Priority Data

Oct. 23, 2007   (JP) .................................. 2007-275531

(51) Int. Cl.
*G06F 7/00* (2006.01)
*G06F 17/00* (2006.01)
*G06F 19/00* (2006.01)

(52) U.S. Cl. ............. 701/67; 701/68; 417/44.1; 60/428; 192/3.28; 192/3.29; 192/3.3

(58) Field of Classification Search ............... 701/67–68; 417/44.1; 60/428; 192/3.28, 3.29, 3.3
See application file for complete search history.

(56) References Cited

U.S. PATENT DOCUMENTS

| 5,363,718 | A  | * | 11/1994 | Ganser et al. ............ 74/501.5 R |
|---|---|---|---|---|
| 5,806,010 | A  |   | 9/1998  | Sawada |
| 6,647,326 | B2 |   | 11/2003 | Nakamori et al. |
| 6,988,974 | B2 | * | 1/2006  | Kobayashi et al. ................ 477/3 |
| 7,084,591 | B2 | * | 8/2006  | Kobayashi et al. ....... 318/400.02 |
| 7,347,803 | B2 | * | 3/2008  | Kobayashi et al. ................ 477/5 |
| 7,351,182 | B2 | * | 4/2008  | Kobayashi ......................... 477/5 |
| 7,762,365 | B2 | * | 7/2010  | Iwanaka et al. ............ 180/65.22 |
| 2006/0089232 | A1 | * | 4/2006 | Kobayashi et al. ............. 477/70 |

(Continued)

FOREIGN PATENT DOCUMENTS

JP      8-85372 A      4/1996

(Continued)

OTHER PUBLICATIONS

Performance of SR drive for hydraulic pump; Kim, B.C.; Lee, D.H.; Ahm, J.W.; Electrical Machines and Systems, 2005. ICEMS 2005. Proceedings of the Eighth International Conference on; vol. 1; Digital Object Identifier: 10.1109/ICEMS.2005.202613 Publication Year: 2005 , pp. 659-663 vol. 1.*

(Continued)

*Primary Examiner* — Cuong H Nguyen
(74) *Attorney, Agent, or Firm* — Sughrue Mion, PLLC

(57) ABSTRACT

A vehicle control device including an input member drive-connected to a power source; a mechanical pump; an electric pump assisting the mechanical pump; a drive mechanism transmitting the rotational driving force of the input member to an output member; a fluid coupling between the input member and the drive transmission mechanism and including a lock-up engagement element which receives hydraulic oil discharged from the mechanical pump and the electric pump to operate; a state detection unit that detects the state of the one or more factors that the discharge of the electric pump; and a control unit which executes a first or second control mode, wherein the first control mode permits engagement of the lock-up engagement element if a first condition is satisfied based on the one or more factors, and wherein a second control mode inhibits engagement of the lock-up engagement element if the first condition is not satisfied.

20 Claims, 7 Drawing Sheets

U.S. PATENT DOCUMENTS

2007/0241611 A1* 10/2007 Shimada et al. .............. 303/152
2011/0129356 A1* 6/2011 Kobayashi et al. .......... 417/44.1

FOREIGN PATENT DOCUMENTS

| JP | 11-211193 A | | 8/1999 |
|---|---|---|---|
| JP | 11-222054 A | | 8/1999 |
| JP | 2000-170888 A | | 6/2000 |
| JP | 2002-382587 | * | 12/2002 |
| JP | 2003-172444 A | | 6/2003 |
| JP | 2004-145180 | * | 5/2004 |
| JP | 2004-320799 | * | 11/2004 |
| JP | 2005-231440 A | | 9/2005 |

OTHER PUBLICATIONS

IEEE Standard Definitions for Power Switchgear; IEEE Std C37. 100-1992; Digital Object Identifier: 10.1109/IEEESTD.1992. 106978; Publication Year: 1992.*

Kim et al., Performance analysis of a CVT clutch system for a hybrid electric vehicle, International Journal of Automotive Technology; vol. 10, No. 1, 115-121 (2009), DOI: 10.1007/s12239-009-0014-4.*

* cited by examiner

F I G . 10
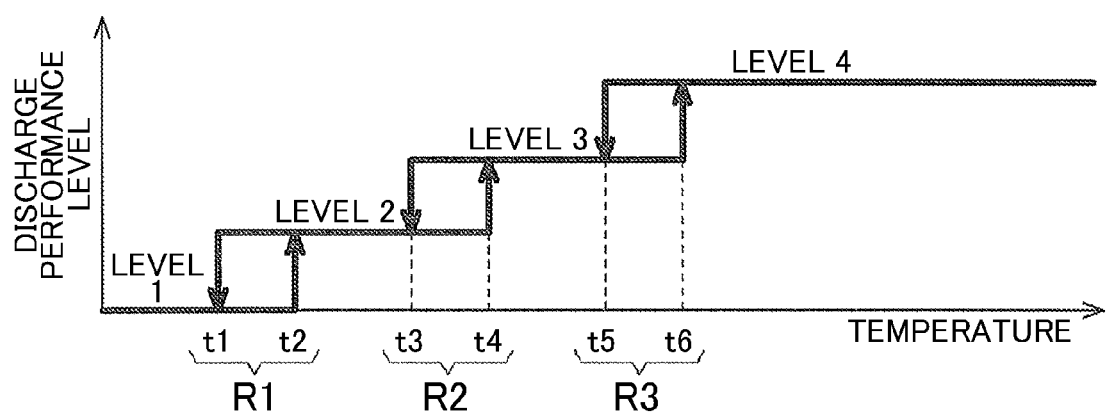

VEHICLE CONTROL DEVICE

CROSS-REFERENCE TO RELATED APPLICATIONS

This Application claims priority from Japanese Patent Application No. 2007-275531 filed on Oct. 23, 2007, the disclosure of which, including the specification, drawings and abstract, is incorporated herein by reference in its entirety.

BACKGROUND OF THE INVENTION

1. Field of the Invention

Apparatus and methods consistent with the present invention relate to a vehicle control device including an input member drive-connected to a drive power source, such as an engine or a rotating electrical machine, and may also includes a mechanical pump which operates by rotational driving force of the input member, and an electric pump which assists the mechanical pump.

2. Description of the Related Art

In recent years, vehicles having an idling stop function of stopping an engine when the vehicle makes a stop, hybrid vehicles including an engine and a rotating electrical machine (motor or generator) as a drive power source, electric vehicles (electric cars) including a rotating electrical machine as a drive power source, and the like have received attention in terms of energy saving and environmental issues. These vehicles are structured such that the rotation of the drive power source, such as the engine, is completely stopped in a vehicle stopped state, such as during a red light. Therefore, a mechanical pump, which is an oil pump operated by rotational driving force of the drive power source, also stops in the vehicle stopped state, whereby hydraulic pressure of hydraulic oil supplied to a drive transmission system, e.g., an automatic transmission device or a torque converter, decreases. In the case where the vehicle is started from a state where the hydraulic pressure is decreased in this manner, a friction engagement element such as a clutch or brake included in the drive transmission system cannot be engaged appropriately during a period from when the drive power source is started until the hydraulic pressure rises. Thus, situations exist where the vehicle is started in an abnormal manner due to these friction engagement elements suddenly engaging to cause a shock or the like. To try and avoid these situations, a configuration including an electric pump which assists the mechanical pump in order to maintain the hydraulic pressure of the hydraulic oil supplied to the drive transmission system even while the drive power source is stopped has been known (for example, see Japanese Patent Application Publication No. JP-A-2003-172165).

Japanese Patent Application Publication No. JP-A-2003-172165 discloses a parallel hybrid vehicle in which a rotating electrical machine is connected to a crank shaft of an engine, and which is provided with a torque converter and an automatic transmission device between the engine/rotating electrical machine and a wheel. As a friction engagement element, the torque converter includes a lock-up clutch, and the automatic transmission device includes a plurality of clutches and brakes for switching shift speeds. As an oil pump, the vehicle includes a mechanical pump which is operated by the driving force of the engine and the rotating electrical machine as the drive power sources, and an electric pump which operates independently of theses drive power sources. In a state where the engine and the rotating electrical machine are stopped, the vehicle basically supplies the hydraulic oil discharged by the electric pump to the automatic transmission device, and causes the clutch or the brake to engage. However, when the electric pump cannot be driven, such as in cases where the oil temperature of the hydraulic oil is extremely high or extremely low, the electric pump is not operated and the rotating electrical machine is driven to supply hydraulic oil using the mechanical pump. Note that, in Japanese Patent Application Publication No. JP-A-2003-172165, there is no description regarding the operation control of the lock-up clutch of the torque converter.

In the case where a rotating electrical machine is used as the drive power source as with this hybrid vehicle, it differs from a general vehicle, which uses only an engine as the drive power source, in that the driving force can be output from zero rotation to start and run the vehicle. In such vehicles, it has been desired to improve transmission efficiency of the rotational driving force between the drive power source and the wheel, which would improve drive efficiency and energy regeneration efficiency by preventing slippage of a fluid coupling such as the torque converter. It is also desired and that the vehicle be started or run at low vehicle speed with a lock-up engagement element such as a lock-up clutch in an engaged state in order to improve energy efficiency by preventing generation of heat of the hydraulic oil in the fluid coupling. When such vehicles are started or run at low vehicle speed, it is necessary to engage the lock-up engagement element using hydraulic pressure of the hydraulic oil discharged from the electric pump, since the discharge amount of the hydraulic oil from the mechanical pump is not sufficient.

However, in order to run the vehicle in a state where the lock-up engagement element is engaged, and to ensure that a transmission torque capacity greater than or equal to the rotational driving force from the drive power source, a relatively high hydraulic pressure is necessary. However, since the electric pump generally has a lower discharge performance than the mechanical pump, a situation may arise in which the discharge amount of the hydraulic oil from the electric pump becomes insufficient and the necessary hydraulic pressure cannot be ensured. This situation may arise depending on various conditions such as oil temperature of the hydraulic oil, power supply voltage of the electric pump, and the like. For example, in the case where the temperature of the hydraulic oil is extremely low, the viscosity of the hydraulic oil increases and the discharge amount of the hydraulic oil from the electric pump decreases. On the contrary, in the case where the temperature of the hydraulic oil is extremely high, the viscosity of the hydraulic oil decreases to increase the leakage amount from respective sections of supply destinations of the hydraulic oil, and the discharge amount of the hydraulic oil from the electric pump becomes relatively insufficient. When an attempt to engage the lock-up engagement element is made in a state where the discharge amount of the hydraulic oil from the electric pump is insufficient, there is a possibility that an engagement failure such as slippage occurs, a shock due to sudden engagement occurs, or the like. On the other hand, when the electric pump having a high discharge performance is used to prevent such a situation, there are problems that the pump increases in size, increases in weight and volume and that energy consumption (electrical power consumption) necessary for the operation of the electric pump increases.

SUMMARY

Exemplary embodiments of the present invention resolve such shortcomings and other shortcomings not described above. Also, the present invention is not required to overcome the shortcomings described above, and exemplary embodiments of the present invention may not overcome any of the problems described above.

In one aspect, the present invention provides a vehicle control device which is structured such that hydraulic oil discharged from an electric pump can be supplied to a lock-up engagement element of a fluid coupling to engage the lock-up engagement element, in which the occurrence of an engagement failure, the occurrence of a shock, and the like of the lock-up engagement element can be prevented while preventing increase in size and increase in energy consumption of the electric pump.

According to one aspect of the present invention, a vehicle control device includes an input member drive-connected to a drive power source, a mechanical pump which operates by rotational driving force of the input member, an electric pump which assists the mechanical pump, a drive transmission mechanism which transmits the rotational driving force of the input member to an output member, a fluid coupling provided between the input member and the drive transmission mechanism and including a lock-up engagement element which receives supply of hydraulic oil discharged from the mechanical pump and the electric pump to operate, a state detection unit which performs state detection for one or more factors influencing a discharge performance of the electric pump, and a control unit which executes a first control mode of permitting engagement of the lock-up engagement element in a case where a predetermined first condition specifying on the one or more factors influencing the discharge performance of the electric pump is satisfied, and executes a second control mode of inhibiting the engagement of the lock-up engagement element in a case where the first condition is not satisfied, based on a detection result of the state detection unit.

According to one aspect of the present invention whether to engage the lock-up engagement element of the fluid coupling is selected in accordance with whether the predetermined first condition, specifying on the one or more factors influencing the discharge performance of the electric pump, is satisfied. For example, in accordance with the state of the one or more factors influencing the discharge performance of the electric pump, the vehicle can be run in a state where the lock-up engagement element is engaged by permitting engagement of the lock-up engagement element when the discharge amount of the electric pump is sufficient, and the vehicle can be run in a drive transmission state via the fluid coupling by inhibiting engagement of the lock-up engagement element when the discharge amount of the electric pump is insufficient. Accordingly, it becomes unnecessary to use the electric pump having a high discharge performance to prevent a situation in which the discharge amount of the electric pump becomes insufficient. Thus, increase in size and increase in energy consumption of the electric pump can be prevented. Since engagement of the lock-up engagement element can be prevented in a state where the discharge amount of the electric pump is insufficient, occurrence of an engagement failure of the lock-up engagement element, occurrence of a shock, and the like can be prevented.

According to one aspect of the present invention, the first condition may be a condition specifying a state where a discharge amount of the electric pump can reach a necessary amount for engaging the lock-up engagement element so as to enable transmission of rotational driving force from the drive power source to the drive transmission mechanism.

With respect to this aspect, the discharge amount of the electric pump is appropriate, and the first control mode of permitting engagement of the lock-up engagement element is executed in a state where the rotational driving force from the drive power source can be transmitted to the drive transmission mechanism. Thus, engagement of the lock-up engagement element can be prevented in the state where the discharge amount of the electric pump is insufficient, and the occurrence of an engagement failure of the lock-up engagement element, the occurrence of a shock, and the like can be prevented.

In one aspect of the present invention the drive transmission mechanism is a transmission device including a shift engagement element, the first control mode is a mode of permitting engagement of both of the lock-up engagement element and the shift engagement element, and the second control mode is a mode of inhibiting the engagement of the lock-up engagement element and permitting the engagement of the shift engagement element.

For example, in accordance with the state of the one or more factors influencing the discharge performance of the electric pump, the rotational driving force of the drive power source can be directly transmitted to the transmission device in a predetermined shift state without an intervention of the fluid coupling to run the vehicle by permitting the engagement of both of the lock-up engagement element and the shift engagement element, in the state where the discharge amount of the electric pump is sufficient. Also, for example, the rotational driving force of the drive power source can be transmitted to the transmission device in the predetermined shift state via the fluid coupling to run the vehicle by inhibiting the engagement of the lock-up engagement element and permitting engagement of the shift engagement element, in the state where the discharge amount of the electric pump is insufficient. In the drive transmission state via the fluid coupling, the rotational speed of the input member and the mechanical pump increases before the rotational driving force transmitted to the shift engagement element increases due to the slippage of the fluid coupling, whereby the engagement of the shift engagement element can be performed appropriately even in the state where the discharge amount of the electric pump is insufficient.

In one aspect of the present invention, the control unit executes a third control mode, stopping the electric pump after a rotational speed of the mechanical pump has become greater than or equal to a predetermined operation threshold value while executing the second control mode, in a case where a predetermined second condition, which specifies a state where the discharge performance of the electric pump is decreased compared to the first condition for the one or more factors influencing the discharge performance of the electric pump, is not satisfied based on the detection result of the state detection unit.

With this configuration, in the case where the predetermined second condition, which specifies the state where the discharge performance of the electric pump is decreased compared to the first condition for the one or more factors influencing the discharge performance of the electric pump, is not satisfied, a protection control of the electric pump against excess load and the like can be performed while avoiding trouble in the execution of the second control mode. That is, in accordance with one aspect of the present invention, in the state where the discharge performance of the electric pump is decreased, the electric pump is stopped after the rotational speed of the mechanical pump is made greater than or equal to the predetermined operation threshold value to ensure the supply of the hydraulic oil. Therefore, the electric pump can be stopped to protect against excess load while preventing occurrence of a pressure drop of the hydraulic oil due to the electric pump stopping during the execution of the second control mode. By preventing the pressure drop of the hydraulic oil during the execution of the second control mode, the engagement of the shift engagement element of the transmission device can appropriately be maintained, and the occurrence of an engagement failure of the shift engagement element, the occurrence of a shock, and the like can be prevented.

In one aspect of the present invention, the second condition is a condition specifying a boundary of a predetermined safety region up to a state where the electric pump is at a limit of being capable of operating appropriately.

For example, the electric pump can be stopped to protect against excess load and the like while avoiding trouble in the execution of the second control mode until a state is reached where the electric pump is at the limit of being capable of operating appropriately.

In another aspect of the present invention, the control unit immediately stops the electric pump and executes a fourth control mode of performing control of shifting to the second control mode after the rotational speed of the mechanical pump has become greater than or equal to the predetermined operation threshold value, in a case where a predetermined third condition, which specifies a state where the factor influencing the discharge performance of the electric pump is at a limit within which the electric pump can operate appropriately, is not satisfied based on the detection result of the state detection unit.

According to another aspect of the present invention, in the case where the factor influencing the discharge performance of the electric pump has exceeded a limit state of being capable of operating the electric pump appropriately, the protection of the electric pump against excess load and the like can be performed promptly by immediately stopping the electric pump. By shifting to the second control mode after the rotational speed of the mechanical pump has become greater than or equal to the predetermined operation threshold value, the second control mode can be executed using the hydraulic pressure of the hydraulic oil discharged from the mechanical pump. In this manner, by operating the mechanical pump in the case where the electric pump has exceeded the limit state of being capable of operating appropriately, an appropriate running state of the vehicle can be maintained while effectively using the electric pump in accordance with the discharge performance of the electric pump.

In one aspect, engagement of both of the lock-up engagement element and the shift engagement element is inhibited until the rotational speed of the mechanical pump becomes greater than or equal to the predetermined operation threshold value in the fourth control mode.

For example, the engagement of the lock-up engagement element and the shift engagement element can be inhibited in a state where the hydraulic pressure of the hydraulic oil is insufficient until the rotational speed of the mechanical pump has become greater than or equal to the predetermined operation threshold value and necessary hydraulic pressure of the hydraulic oil is ensured. Thus, the occurrence of an engagement failure of these engagement elements, the occurrence of a shock, and the like can be prevented.

In one aspect of the present invention, the third condition is a condition specifying a state where the discharge amount of the electric pump is at a limit of being able to reach a necessary amount for engaging the shift engagement element so as to enable transmission of the rotational driving force transmitted from the drive power source via the fluid coupling to a transmission downstream side with the lock-up engagement element in a released state.

For example, the fourth control mode is executed in the case where the electric pump has come to a state where the discharge amount cannot reach an amount necessary for executing the second control mode. Thus, the protection of the electric pump against excess load and the like can appropriately be performed, and the appropriate running state of the vehicle can be maintained.

In one aspect of the present invention, the control unit executes the fourth control mode when the electric pump detects a failure.

For example when the failure of the electric pump is detected, the electric pump is immediately stopped, and the second control mode using the hydraulic pressure of the hydraulic oil discharged from the mechanical pump is executed. Thus, even when the electric pump has failed, the appropriate running state of the vehicle can be maintained.

Another aspect of the present invention includes a rise determination unit, which determines whether a transient state from a start of operation of the electric pump until a rise of hydraulic pressure of the hydraulic oil has passed and the rise of the hydraulic pressure of the hydraulic oil is completed. Additionally, the control unit performs a determination on whether the first condition is satisfied after the rise determination unit has determined that the rise is completed.

For example, in the case where the hydraulic oil in the hydraulic pressure circuit has fallen out in a situation where both of the electric pump and the mechanical pump are stopped, there are cases where a certain amount of time of the transient state exists from the start of operation of the electric pump until the rise of the hydraulic pressure of the hydraulic oil when the electric pump is started, because a certain amount of time is necessary for filling the hydraulic pressure circuit with the hydraulic oil corresponding to the amount fallen out or the like. In this example, the determination of the first condition can be prevented from being performed in the transient state, whereby an appropriate determination can be performed.

In another aspect of the present invention, the rise determination unit obtains an expected time until completion of the rise of the hydraulic pressure of the hydraulic oil, based on an elapsed time of a state where both of the mechanical pump and the electric pump are stopped and a temperature of the hydraulic oil, and determines that the rise is completed when the expected time has elapsed.

For example, a rise completion determination of the hydraulic pressure can appropriately be performed, even in the case where a hydraulic pressure sensor, which detects the hydraulic pressure of the hydraulic oil, and the like are not provided. That is, based on the elapsed time of the state where both of the mechanical pump and the electric pump are stopped, the amount of the hydraulic oil fallen out from the hydraulic pressure circuit can be estimated. Also, based on the temperature of the hydraulic oil, changes of the discharge amount from the electric pump in accordance with the changing viscosity of the hydraulic oil, the tendency of the hydraulic oil in the hydraulic pressure circuit to fall out, and the like can be estimated. Thus, based on such information, the time until the completion of the rise of the hydraulic pressure can be estimated with relatively high accuracy to perform the rise completion determination. Note that a configuration in which the completion of the rise of the hydraulic pressure of the hydraulic oil is directly detected using a hydraulic pressure detection unit such as the hydraulic pressure sensor is also possible.

In one aspect of the present invention, the factor influencing the discharge performance of the electric pump includes the temperature of the hydraulic oil, and the first condition includes a condition specifying a temperature range of the hydraulic oil.

For example, a condition of an appropriate temperature range in consideration of the viscosity of the hydraulic oil which changes in accordance with the temperature can be included in the first condition. Thus, whether the discharge amount of the electric pump reaches a necessary amount can appropriately be determined in consideration of the discharge performance of the electric pump depending on the change of the viscosity of the hydraulic oil in accordance with the temperature.

In another aspect, the factor influencing the discharge performance of the electric pump includes voltage of a power supply of the electric pump, and the first condition includes a condition specifying a voltage range of the power supply.

For example, a condition of a range of voltage of the power supply necessary for appropriately operating the electric pump can be included in the first condition. Thus, whether the discharge amount of the electric pump reaches the necessary amount can appropriately be determined in consideration of the discharge performance of the electric pump which changes in accordance with the voltage of the power supply.

In another aspect of the present invention, the factor influencing the discharge performance of the electric pump includes the temperature of the hydraulic oil and the voltage of the power supply of the electric pump, and the first condition includes a condition of a range specified by both of the temperature of the hydraulic oil and the voltage of the power supply.

For example, a condition of an appropriate temperature-voltage range in consideration of the relation of both of the viscosity of the hydraulic oil changing in accordance with the temperature and the voltage of the power supply of the electric pump can be included in the first condition. Thus, whether the discharge amount of the electric pump reaches the necessary amount can appropriately be determined in consideration of the discharge performance of the electric pump which changes in accordance with both of the viscosity of the hydraulic oil in accordance with the temperature and the voltage of the power supply.

In another aspect of the present invention, the factor influencing the discharge performance of the electric pump includes temperature of at least one of a driving electric motor of the electric pump and a driver of the driving electric motor, and the first condition includes a condition specifying a temperature range of at least one of the driving electric motor and the driver.

For example, a condition of a temperature range of at least one of the driving electric motor of the electric pump, which easily changes in accordance with a load state of the electric pump, and the driver of the driving electric motor can be included in the first condition. Thus, the discharge performance of the electric pump can be estimated from the load state of the electric pump to appropriately determine whether the discharge amount of the electric pump reaches the necessary amount.

In another aspect of the present invention, a rotating electrical machine is included as the drive power source and the control unit controls transmitting rotational driving force of the rotating electrical machine to a wheel to start a vehicle in a state where the lock-up engagement element is engaged. Note that, in one exemplary embodiment of the present invention, the "rotating electrical machine" is used as a concept including all of a motor (electric motor), a generator (electric generator), and, if necessary, a motor generator which serves a function of both of the motor and the generator.

For example, in a hybrid vehicle, an electric vehicle, or the like including the rotating electrical machine as the drive power source, improving the transmission efficiency of the rotational driving force results in improvements to the drive efficiency and the energy regeneration efficiency by transmitting the rotational driving force of the rotating electrical machine to the wheel to start the vehicle in the state where the lock-up engagement element is engaged. Further, as described above, it is possible to prevent the increase in size and the increase in energy consumption of the electric pump, and to prevent the occurrence of an engagement failure of the lock-up engagement element, the occurrence of a shock, and the like.

In another aspect of the present invention an engine is further included as the drive power source, and the input member is selectively connected with the engine via a transmission clutch.

For example, in a hybrid vehicle including both of the rotating electrical machine and the engine as the drive power source, improving the transmission efficiency of the rotational driving force results in improvements to the drive efficiency and the energy regeneration efficiency by releasing the transmission clutch to separate the engine and transmitting the rotational driving force of the rotating electrical machine to the wheel to start the vehicle in the state where the lock-up engagement element is engaged. Further, as described above, it is possible to prevent the increase in size and the increase in energy consumption of the electric pump, and to prevent the occurrence of an engagement failure of the lock-up engagement element, the occurrence of a shock, and the like.

BRIEF DESCRIPTION OF THE DRAWINGS

Exemplary embodiments of the present invention will now be described in greater detail with reference to FIG. 1 to 10, in which:

FIG. 10 is a view showing an example of an electric pump (EP) temperature table according to a second exemplary embodiment of the present invention.

DETAILED DESCRIPTION OF EXEMPLARY EMBODIMENTS

The invention will now be described herein with reference to illustrative exemplary embodiments. Those skilled in the art will recognize that many alternative embodiments can be accomplished using the teachings of the present invention and that the invention is not limited to the exemplary embodiments described below. Like reference numbers will denote like elements.

1. First Embodiment

Figure 1:
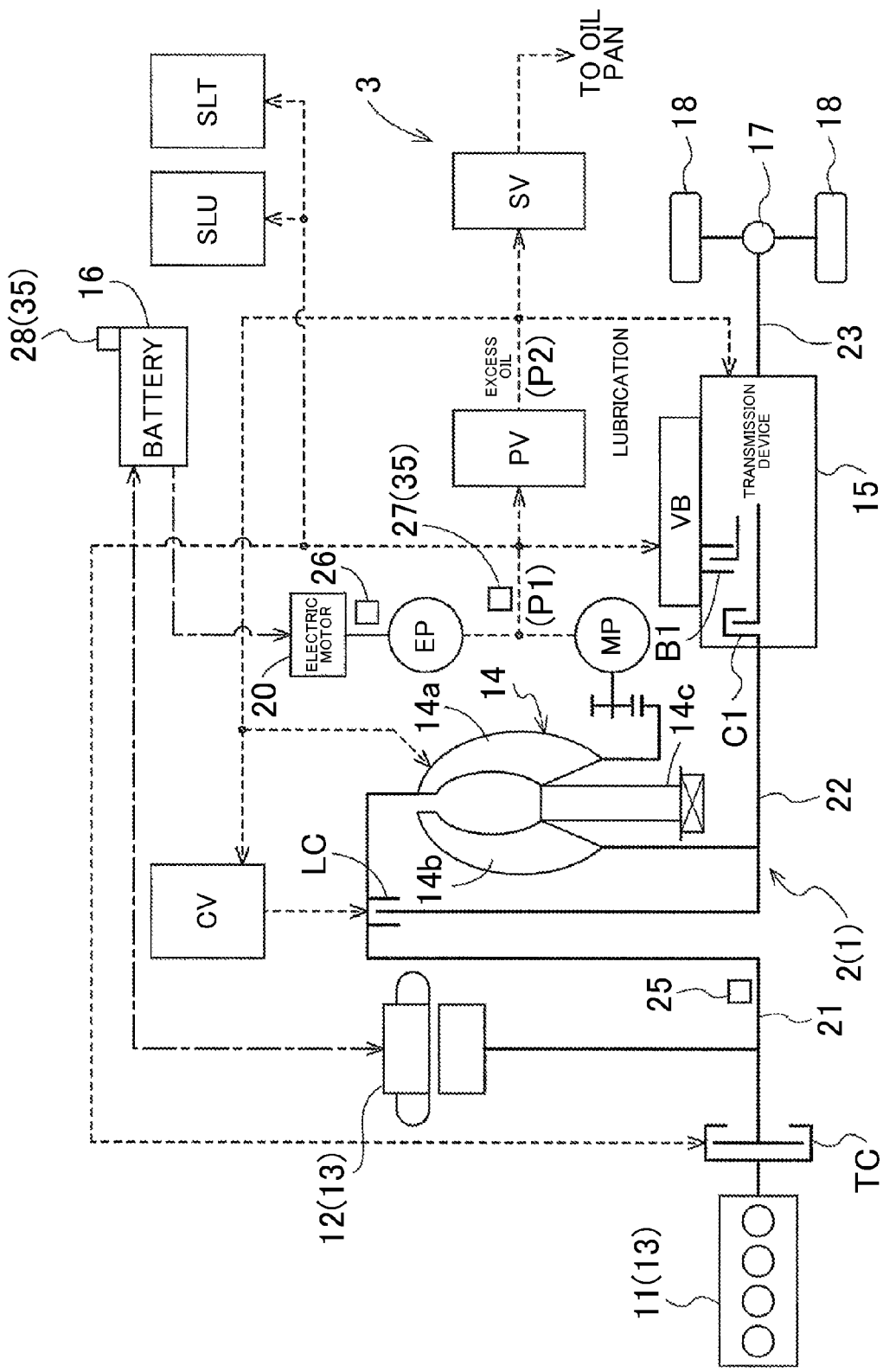
FIG. 1 is a schematic diagram showing a configuration of a vehicle drive device including a vehicle control device according to a first exemplary embodiment of the present invention.
Figure 2:
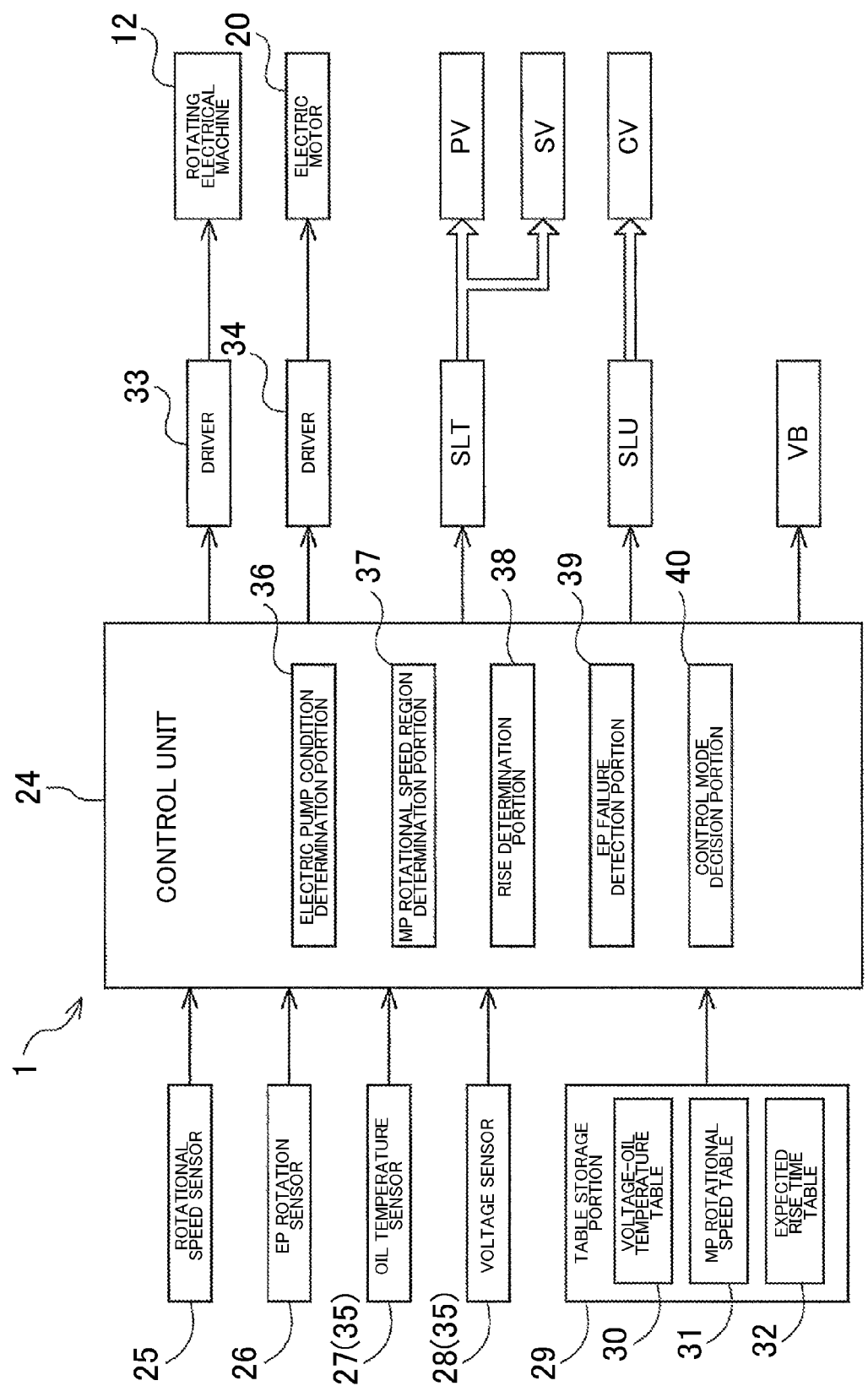
FIG. 2 is a block diagram showing a configuration of a control system of the vehicle control device according to the first exemplary embodiment.

In this exemplary embodiment, a case where a vehicle control device 1 according to the present invention is applied to a vehicle drive device 2 for a hybrid vehicle will be described. FIG. 1 is a schematic diagram showing a configuration of a drive transmission system and a hydraulic pressure control system of the vehicle drive device 2 including the vehicle control device 1 according to this exemplary embodiment. In the figure, a solid line shows a transmission route of driving force, a dotted line show a supply route of hydraulic oil, and a dashed-dotted line shows a supply route of electric power. Note that (P1) or (P2) arranged near the dotted line shows that the hydraulic pressure of the hydraulic oil in the supply route is a first hydraulic pressure P1 or a second hydraulic pressure P2. As shown in FIG. 1, the vehicle drive device 2 according to this exemplary embodiment includes an engine 11 and a rotating electrical machine 12 as drive power source 13, and is structured such that the driving force of the drive power source 13 is transmitted to a wheel 18 via a torque converter 14 and a transmission device 15. The vehicle drive device 2 includes a hydraulic control device 3 for supplying the hydraulic oil to respective sections such as the torque converter 14 and the transmission device 15. FIG. 2 is a block diagram showing a configuration of a control system of the vehicle control device 1 according to this exemplary embodiment. In the figure, a solid line shows a transmission route of a signal, and a white arrow shows a transmission route of signal pressure. As shown in the figure, the vehicle control device 1 according to this exemplary embodiment controls sections of the vehicle drive device 2 including the hydraulic control device 3.

1-1. Configuration of Drive Transmission System of Vehicle Drive Device in Accordance with One Exemplary Embodiment First, a configuration of the drive transmission system of the vehicle drive device 2 according to this exemplary embodiment will be described. As shown in FIG. 1, the vehicle drive device 2 is a drive device for a parallel hybrid vehicle including the engine 11 and the rotating electrical machine 12 as the drive power source 13 for driving the vehicle, the engine 11 and the rotating electrical machine 12 being connected in series via a transmission clutch TC. The engine 11 is an internal combustion engine, and various known engines, e.g., a gasoline engine or a diesel engine, may be used. The rotating electrical machine 12 is capable of functioning as a motor (electric motor) which receives supply of electric power to generate power and also functioning as a generator (electric generator) which receives supply of power to generate electric power. Therefore, the rotating electrical machine 12 is electrically connected with a battery 16 as an electric storage device. That is, the rotating electrical machine 12 runs with electric power supply received from the battery 16 or charges the battery 16 with electric power generated by the rotational driving force transmitted from the wheel. In one exemplary embodiment, a capacitor may be used as the electric storage device or use a battery together with a capacitor. A rotor of the rotating electrical machine 12 is connected with an input shaft 21 so as to rotate integrally. The transmission clutch TC for selectively connecting the engine 11 to the input shaft 21 is provided between the engine 11 and the rotating electrical machine 12. That is, in one exemplary embodiment the input shaft 21 is selectively connected with the engine via the transmission clutch TC. The transmission clutch TC receives supply of the hydraulic oil of the first hydraulic pressure P1 described later, and is controlled by a hydraulic pressure control valve to be operated. In this exemplary embodiment, the input shaft 21 corresponds to an input member of the present invention.

In the vehicle drive device 2, when the vehicle is started or running at low speed, the transmission clutch TC is released, the engine 11 comes to a stopped state, and only the rotational driving force of the rotating electrical machine 12 is transmitted to the wheel 18 to run the vehicle. At this time, the rotating electrical machine 12 receives supply of electric power from the battery 16 to generate the driving force. In a state where the rotational speed of the rotating electrical machine 12 becomes greater than or equal to a certain level, the transmission clutch TC is engaged, whereby the engine 11 is cranked to be started. After the engine 11 is started, the rotational driving force of both of the engine 11 and the rotating electrical machine 12 is transmitted to the wheel 18 to run the vehicle. In this case, the rotating electrical machine 12 may be in either one of a state where electricity is generated by the rotational driving force of the engine 11 and a state where the driving force is generated by the electric power supplied from the battery 16, depending on the amount of charge in the battery 16. When the speed of the vehicle is reduced, the transmission clutch TC is released, the engine 11 comes into the stopped state, and the rotating electrical machine 12 comes into the state where electricity is generated by the rotational driving force transmitted from the wheel 18. The battery 16 is charged by the electric power generated by the rotating electrical machine 12. When the vehicle is stopped, the transmission clutch TC is in a released state, and the engine 11 and the rotating electrical machine 12 are in the stopped state.

In one exemplary embodiment, the vehicle drive device 2 includes the transmission device 15 which transmits the rotational driving force of the input shaft 21, which is drive-connected to the drive power source 13, to an output shaft 23 and the torque converter 14, which is provided between the input shaft 21 and the transmission device 15. In this exemplary embodiment, the transmission device 15 is a device which shifts the rotational driving force transmitted from the drive power source 13 via the torque converter 14 and transmits it to the output shaft 23 on the wheel 18 side. The torque converter 14 is a device which transmits the rotational driving force of the input shaft 21 that is drive-connected to the drive power source 13 to the transmission device 15 via an intermediate shaft 22. In this exemplary embodiment, the torque converter 14 corresponds to a fluid coupling of the present invention.

In this exemplary embodiment, the torque converter 14 includes a pump impeller 14a as an input side rotation member connected to the input shaft 21, a turbine runner 14b as an output side rotation member connected to the intermediate shaft 22, and a stator 14c provided therebetween and including a one-way clutch. The torque converter 14 performs transmission of the driving force between the pump impeller 14a on the driving side and the turbine runner 14b on the driven side via the hydraulic oil filled therein. In this exemplary embodiment, the torque converter 14 includes a lock-up clutch LC as a lock-up friction engagement element. The lock-up clutch LC is a clutch which connects the pump impeller 14a and the turbine runner 14b to rotate integrally, in order to eliminate a rotation difference (slippage) between the pump impeller 14a and the turbine runner 14b and improve transmission efficiency. Thus, in the engaged state of the lock-up clutch LC, the torque converter 14 directly transmits the driving force of the drive power source 13 (input shaft 21) to the transmission device 15 (intermediate shaft 22) without intervention of the hydraulic oil. The hydraulic oil of the second hydraulic pressure P2 is supplied to the torque converter 14 including the lock-up clutch LC. In this exemplary embodiment, the lock-up clutch LC corresponds to a lock-up engagement element of the present invention, and the output shaft 23 corresponds to an output member of the present invention.

In this exemplary embodiment, the transmission device 15 is an automatic transmission having a plurality of shift speeds. Thus, the transmission device 15 may include a gear mechanism, such as a planetary gear mechanism, and a plurality of friction engagement elements, such as clutches or brakes, for performing engagement or release of a rotational element of the gear mechanism and switching the shift speeds, in order to structure the plurality of shift speeds having different transmission gear ratios. FIG. 1 shows an example of a first clutch C1 and a first brake B1 as the friction engagement elements. Note that the actual transmission device 15 may include additional friction engagement elements such as clutches and brakes. The transmission device 15 shifts the rotational speed of the intermediate shaft 22 at a predetermined transmission gear ratio set for each shift speed and converts the torque to be transmitted to an output shaft 27. The rotational driving force transmitted to the output shaft 27 from the transmission device 15 is transmitted to the wheel 18 via a differential device 17.

In this exemplary embodiment, the plurality of friction engagement elements C1, B1, and the like of the transmission device 15 receive supply of the hydraulic oil of the first hydraulic pressure P1, and are controlled by a shift control valve VB, which is a hydraulic pressure control valve for shift control. The plurality of friction engagement elements C1, B1, and the like are engaged or released to switch the plurality of shift speeds. For example, a first speed is formed with only the first clutch C1 in the engaged state, and a second speed is formed with the first clutch C1 and the first brake B1 in the engaged state. In this embodiment, the vehicle is started or running at low speed in the first speed, and the first speed is formed with only the first clutch C1 in the engaged state. Thus, when the vehicle is started or running at low speed, the first clutch C1 is engaged in the transmission device 15. Note that the hydraulic oil of the second hydraulic pressure P2 is supplied in order to lubricate or cool the respective sections of the transmission device 15. In this embodiment, the transmission device 15 corresponds to a drive transmission mechanism of the present invention, and the respective friction engagement elements C1, B1, and the like correspond to a shift engagement element of one exemplary embodiment.

In the vehicle drive device 2, the lock-up clutch LC of the torque converter 14 is in the released state when the shift speed of the transmission device 15 is switched and is in the engaged state when the vehicle is run at the respective shift speeds, in a similar manner as in the case of a general automatic transmission device. Further, in the vehicle drive device 2 according to this exemplary embodiment, the engine 11 and the rotating electrical machine 12 are used as the drive power source 13. Therefore, the rotating electrical machine 12 can be caused to output the driving force from zero rotation to start the vehicle. Thus, in the vehicle drive device 2, the lock-up clutch LC is basically in the engaged state when the vehicle is started or running at low speed to run the vehicle in a state where the rotational driving force of the rotating electrical machine 12 is directly transmitted to the transmission device 15. Accordingly, slippage of the torque converter 14 can be prevented, whereby improving the transmission efficiency of the rotational driving force between the drive power source 13 and the wheel 18 results in improvements to the drive efficiency or the energy regeneration efficiency, and heat generation of the hydraulic oil in the torque converter 14 can be prevented to improve the energy efficiency. In this exemplary embodiment, when the vehicle is started or running at low speed, the hydraulic oil discharged by an electric pump EP is supplied to the lock-up clutch LC and the respective friction engagement elements C1, B1, and the like of the transmission device 15, whereby the engagement thereof is performed. Therefore, the vehicle control device 1 which controls the vehicle drive device 2 is structured such that the lock-up clutch LC comes into the released state in the case where the discharge amount of the hydraulic oil from the electric pump EP is insufficient, in accordance with the state of one or more factors (e.g., temperature of the hydraulic oil), influencing the discharge performance of the electric pump EP. Thus, a control mode for performing transmission of the driving force via the torque converter 14 is executed. The control mode will be described later in detail.

1-2. Configuration of Hydraulic Control Device in Accordance with One Exemplary Embodiment As shown in FIG. 1, the hydraulic control device 3 in accordance with one exemplary embodiment includes two types of pumps, mechanical pump MP and the electric pump EP, as hydraulic pressure sources for taking in the hydraulic oil stored in an oil pan, and supplying the hydraulic oil to the respective sections of the vehicle drive device 2. The mechanical pump MP is an oil pump which operates by the rotational driving force of the input shaft 21 (drive power source 13). As the mechanical pump MP, a gear pump, a vane pump, and the like may be used, for example. In this example, the mechanical pump MP is drive-connected to the input shaft 21 via the pump impeller 14a of the torque converter 14, and is driven by the rotational driving force of the rotating electrical machine 12 or by the rotational driving force of both of the engine 11 and the rotating electrical machine 12. In one exemplary embodiment, the mechanical pump MP is capable of discharging an oil amount sufficiently higher than necessary for the vehicle drive device 2 including the vehicle control device 1. However, the mechanical pump MP does not discharge the hydraulic oil while the input shaft 21 is stopped (i.e., while the vehicle is stopped). Although the mechanical pump MP discharges the hydraulic oil while the input shaft 21 is rotated at low speed (i.e., while the vehicle is running at low speed), there are cases where the amount of oil necessary for the vehicle drive device 2 cannot be supplied. Thus, the vehicle drive device 2 includes the electric pump EP to assist the mechanical pump MP.

The electric pump EP is an oil pump which operates by the driving force of an electric motor 20 for driving the pump independently of the driving force of the drive power source 13. Also as the electric pump EP, the gear pump, the vane pump, and the like may be used, for example. The electric motor 20 which drives the electric pump EP is electrically connected to the battery 16, and receives electric power from the battery 16 to generate the driving force. The electric pump EP is a pump which assists the mechanical pump MP and operates in a state where the necessary amount of oil is not supplied from the mechanical pump MP, such as while the vehicle is stopped or running at low speed as described above.

In one exemplary embodiment, in order to reduce size and weight as well as to reduce power consumption of the electric motor 20, a pump having lower discharge performance than the mechanical pump MP is used as the electric pump EP. In this exemplary embodiment, the electric motor 20 corresponds to a driving electric motor of the electric pump EP of the present invention, and the battery 16 corresponds to a power supply of the electric pump EP of the present invention.

The hydraulic control device 3 includes a first regulator valve (primary regulator valve) PV and a second regulator valve (secondary regulator valve) SV for regulating the hydraulic pressure of the hydraulic oil supplied from the mechanical pump MP and the electric pump EP to a predetermined pressure. The first regulator valve PV regulates the hydraulic pressure of the hydraulic oil supplied from the mechanical pump MP and the electric pump EP to the first hydraulic pressure P1. The second regulator valve SV regulates the hydraulic pressure of excess oil from the first regulator valve PV to the second hydraulic pressure P2. In one exemplary embodiment, the second hydraulic pressure P2 is set to a lower value than that of the first hydraulic pressure P1. The first hydraulic pressure P1 corresponds to a line pressure as a reference hydraulic pressure of the vehicle drive device 2, and a value thereof is determined based on the signal pressure supplied from a linear solenoid valve SLT.

As shown in FIG. 2, the first regulator valve PV and the second regulator valve SV are supplied with the signal pressure from the linear solenoid valve SLT used commonly for hydraulic pressure regulation. As shown in FIG. 1, the first regulator valve PV regulates the hydraulic pressure of the hydraulic oil, which is supplied from the mechanical pump MP and the electric pump EP and is on the upstream side (side of the mechanical pump MP and the electric pump EP) with respect to the first regulator valve PV, to the first hydraulic pressure P1 in accordance with the supplied signal pressure. The first regulator valve PV regulates the amount of the hydraulic oil, which is supplied from the mechanical pump MP and the electric pump EP, to be drained to the second regulator valve SV side, based on a balance of the signal pressure supplied from the linear solenoid valve SLT and feedback pressure of the first hydraulic pressure P1 after the regulation by the first regulator valve PV. That is, in the case where the oil amount of the hydraulic oil supplied from the mechanical pump MP and the electric pump EP is large, the first regulator valve PV increases the amount of the hydraulic oil to be drained to the second regulator valve SV. On the other hand, in the case where the amount of the hydraulic oil supplied from the mechanical pump MP and the electric pump EP is small, the amount of the hydraulic oil to be drained to the second regulator valve SV is decreased. Accordingly, the hydraulic pressure of the hydraulic oil on the upstream side with respect to the first regulator valve PV is regulated to the first hydraulic pressure P1 in accordance with the signal pressure.

In this exemplary embodiment, the second regulator valve SV regulates the hydraulic pressure of the excess oil drained from the first regulator valve PV, i.e., the hydraulic pressure on the downstream side (second regulator valve SV side) with respect to the first regulator valve PV and upstream side (first regulator valve PV side) with respect to the second regulator valve SV, to the predetermined second hydraulic pressure P2, in accordance with the signal pressure supplied from the linear solenoid valve SLT. The second regulator valve SV regulates the amount of the excess hydraulic oil, which is drained from the first regulator valve PV, to be drained to the oil pan, based on a balance of the signal pressure supplied from the linear solenoid valve SLT and feedback pressure of the second hydraulic pressure P2 after the regulation by the second regulator valve SV. That is, in the case where the oil amount of the excess oil from the first regulator valve PV is large, the second regulator valve SV increases the oil amount of the hydraulic oil to be drained to the oil pan. On the other hand, in the case where the oil amount of the excess oil from the first regulator valve PV is small, the oil amount of the hydraulic oil to be drained to the oil pan is decreased. Accordingly, the hydraulic pressure of the hydraulic oil on the upstream side with respect to the second regulator valve SV is regulated to the second hydraulic pressure P2 in accordance with the signal pressure.

In one exemplary embodiment, the linear solenoid valve SLT receives supply of the hydraulic oil of the first hydraulic pressure P1 after the regulation by the first regulator valve PV, as shown in FIG. 1, and regulates an opening degree of the valve in accordance with an SLT command value output from a control unit 24, as shown in FIG. 2, to thereby output the hydraulic oil of the signal pressure in accordance with the SLT command value. The signal pressure output from the linear solenoid valve SLT is basically a value proportional to the SLT command value. The hydraulic oil of the signal pressure output from the linear solenoid valve SLT is supplied to the first regulator valve PV and the second regulator valve SV. Thus, signal pressures of the same value are respectively supplied to the first regulator valve PV and the second regulator valve SV. Accordingly, the control unit 24 is structured to control the first regulator valve PV and the second regulator valve SV so as to be regulated to the first hydraulic pressure P1 and the second hydraulic pressure P2 in accordance with the output SLT command value. The SLT command value, which is a control signal of the linear solenoid valve SLT, is determined by the control unit 24 based on various vehicle information such as a running load or accelerator opening degree, and is output to the linear solenoid valve SLT. In one exemplary embodiment, the SLT command value output from the control unit 24 may be an electric current value which determines the degree to which the linear solenoid valve SLT is opened.

In one exemplary embodiment, the hydraulic oil of the first hydraulic pressure P1, regulated by the first regulator valve PV, is supplied to the plurality of friction engagement elements C1, B1, and the like of the transmission device 15 via the shift control valve VB, and may also supplied to the transmission clutch TC. The hydraulic oil of the second hydraulic pressure P2, regulated by the second regulator valve SV, may be supplied, for example, to a lubricating oil path of the transmission device 15, the torque converter 14, a lock-up control valve CV for controlling the lock-up clutch LC.

The shift control valve VB controls engagement or release of each of the plurality of friction engagement elements C1, B1, and the like of the transmission device 15, and may include a plurality of control valves or brakes corresponding to the respective friction engagement elements C1, B1, and the like. The shift control valve VB performs an opening/closing operation of the plurality of control valves in accordance with a control command value output from the control unit 24 to thereby supply the hydraulic oil of the first hydraulic pressure P1, regulated by the first regulator valve PV, to a hydraulic pressure chamber of the respective friction engagement elements C1, B1, and the like and control the operation of engaging or releasing the respective friction engagement elements C1, B1, and the like. Thus, in one exemplary embodiment, a transmission torque capacity, which is the maximum torque transmittable by the respective friction engagement elements C1, B1, and the like, is approximately proportional to the first hydraulic pressure P1. A proportionality coefficient in this case is a constant determined by the structure of the respective friction engagement elements C1, B1, and the like such as the diameter of a hydraulic pressure piston, the diameter of a friction surface, the number of the friction surfaces (in the case of a multi-plate clutch, a multi-plate brake, or the like), a friction coefficient of a friction member, and the like.

The lock-up control valve CV controls engagement or release of the lock-up clutch LC. The lock-up control valve CV is supplied with the signal pressure from a linear solenoid valve SLU for lock-up control. The lock-up control valve CV supplies the hydraulic oil of the second hydraulic pressure P2, regulated by the second regulator valve SV, to the hydraulic pressure chamber of the lock-up clutch LC by opening/closing the control valve CV in accordance with the supplied signal pressure, and controls engaging or releasing the lock-up clutch LC. Thus, in this exemplary embodiment, the transmission torque capacity, which is the maximum torque transmittable by the lock-up clutch LC, is approximately proportional to the second hydraulic pressure P2. The proportionality coefficient in this case is a constant determined by, for example, the structure of the lock-up clutch LC such as the diameter of a hydraulic pressure piston, the diameter of a friction surface, the number of the friction surfaces (in the case of a multi-plate clutch), and the friction coefficient of a friction member. Note that the linear solenoid valve SLU for lock-up control receives supply of the hydraulic oil of the first hydraulic pressure P1 after the regulation by the first regulator valve PV and regulates the opening degree of the valve in accordance with the control command value output from the control unit 24 to output the hydraulic oil of the signal pressure in accordance with the control command value, in a similar manner as the linear solenoid valve SLT for hydraulic pressure regulation described above.

1-3. Configuration of Control System of Vehicle Control Device in Accordance with One Exemplary Embodiment As shown in FIG. 2, the vehicle control device 1 of this exemplary embodiment includes the control unit 24 as a central member which performs operation control of respective sections of the vehicle drive device 2. In one exemplary embodiment, the control unit 24 includes an arithmetic processing device, such as a CPU, as a central member, and is structured to have a storage device and the like, such as a random access memory (RAM), which is structured to be capable of reading and writing data from the arithmetic processing device and a read-only memory (ROM) which is structured to be capable of reading data from the arithmetic processing device (not shown). In this embodiment, the control unit 24 corresponds to a control unit of the present invention. Respective functional portions 36 to 40 of the control unit 24 may be structured by at least one of software (program) stored in the ROM or the like and hardware such as an arithmetic circuit. A table storage portion 29 described later is structured by a predetermined storage region in the storage device such as the ROM.

As shown in FIGS. 1 and 2, the vehicle control device 1 of one exemplary embodiment includes a plurality of sensors provided on the respective sections of the vehicle drive device 2, specifically, a rotational speed sensor 25, an electric pump rotation sensor (hereinafter called "EP rotation sensor") 26, an oil temperature sensor 27, and a voltage sensor 28. The rotational speed sensor 25 is a sensor which detects the rotational speed of the input shaft 21. In this embodiment, the input shaft 21 is connected with the rotor of the rotating electrical machine 12, the pump impeller 14a of the torque converter 14, and the mechanical pump MP so as to rotate integrally. Thus, the rotational speed detected by the rotational speed sensor 25 is the rotational speed of the rotating electrical machine 12 as well as the rotational speed of the mechanical pump MP. The EP rotation sensor 26 is a sensor which detects the rotational speed of the electric pump EP. The oil temperature sensor 27 is a sensor which detects the temperature of the hydraulic oil. The oil temperature sensor 27 is provided in a position where the temperature of the hydraulic oil discharged from the mechanical pump MP or the electric pump EP can be detected. The voltage sensor 28 is a sensor which detects the voltage of the battery 16. That is, the voltage sensor 28 detects the voltage between a positive terminal and a negative terminal of the battery 16. In this embodiment, the factors influencing the discharge performance of the electric pump EP are the temperature of the hydraulic oil and the voltage of the battery 16 which is the power supply of the electric pump EP. Thus, the oil temperature sensor 27 and the voltage sensor 28 structure a state detection unit 35 which performs a state detection for the one or more factors influencing the discharge performance of the electric pump EP. The respective sensors 25 to 28 output information showing detection results thereof to the control unit 24.

The rotating electrical machine 12 is connected to the control unit 24 via a driver 33. The control of the rotational speed and the rotational driving force (torque) of the rotating electrical machine 12 is performed in accordance with the control signal output from the control unit 24 to the driver 33. In a similar manner, the electric motor 20 for driving the electric pump EP is connected to the control unit 24 via a driver 34. The control of the rotational speed of the electric motor 20 is performed in accordance with the control signal output from the control unit 24 to the driver 34, whereby the control of the rotational speed of the electric pump EP is performed. The linear solenoid valves SLT and SLU are connected to the control unit 24. As described above, in one exemplary embodiment, the first regulator valve PV and the second regulator valve SV are controlled in accordance with the SLT command value as the control signal output from the control unit 24 to the linear solenoid valve SLT, whereby the first hydraulic pressure P1 and the second hydraulic pressure P2 are regulated. The lock-up control valve CV is controlled in accordance with the control signal output from the control unit 24 to the linear solenoid valve SLU, whereby the operation control of the engagement or release of the lock-up clutch LC is performed. The shift control valve VB is connected to the control unit 24. As described above, the operation of the plurality of control valves is performed in accordance with the control command value as the control signal output from the control unit 24 to the shift control valve VB, whereby the operation control of the engagement or release of the respective friction engagement elements C1, B1, and the like of the transmission device 15 is performed.

As shown in FIG. 2, in one exemplary embodiment, the control unit 24 includes an electric pump condition determination portion 36, a mechanical pump rotational speed region determination portion (hereinafter called "MP rotational speed region determination portion") 37, a rise determination portion 38, an electric pump failure detection portion (hereafter called "EP failure detection portion") 39, and a control mode decision portion 40. The table storage portion 29 referenced by the control unit 24 stores a voltage-oil temperature table 30, a mechanical pump rotational speed table (hereinafter called "MP rotational speed table") 31, and an expected rise time table 32. The respective functional portions 36 to 40 of the control unit 24 and the respective referenced tables 30 to 32 will be described in detail below.

The electric pump condition determination portion 36 determines whether a predetermined first condition R1, second condition R2, and third condition R3 specifying on one or more factors influencing the discharge performance of the electric pump EP detected by the state detection unit 35 are satisfied. As described above, in this exemplary embodiment, the temperature of the hydraulic oil detected by the oil temperature sensor 27 and the voltage of the battery 16 detected by the voltage sensor 28 are at least some of the factors influencing the discharge performance of the electric pump EP. Thus, the first condition R1, the second condition R2, and the third condition R3 are conditions of ranges specified by both of the temperature of the hydraulic oil and the voltage of the battery 16. The conditions R1 to R3 are stored in the table storage portion 29 as the voltage-oil temperature table 30, which can be referenced by the electric pump condition determination portion 36.

Figure 3:
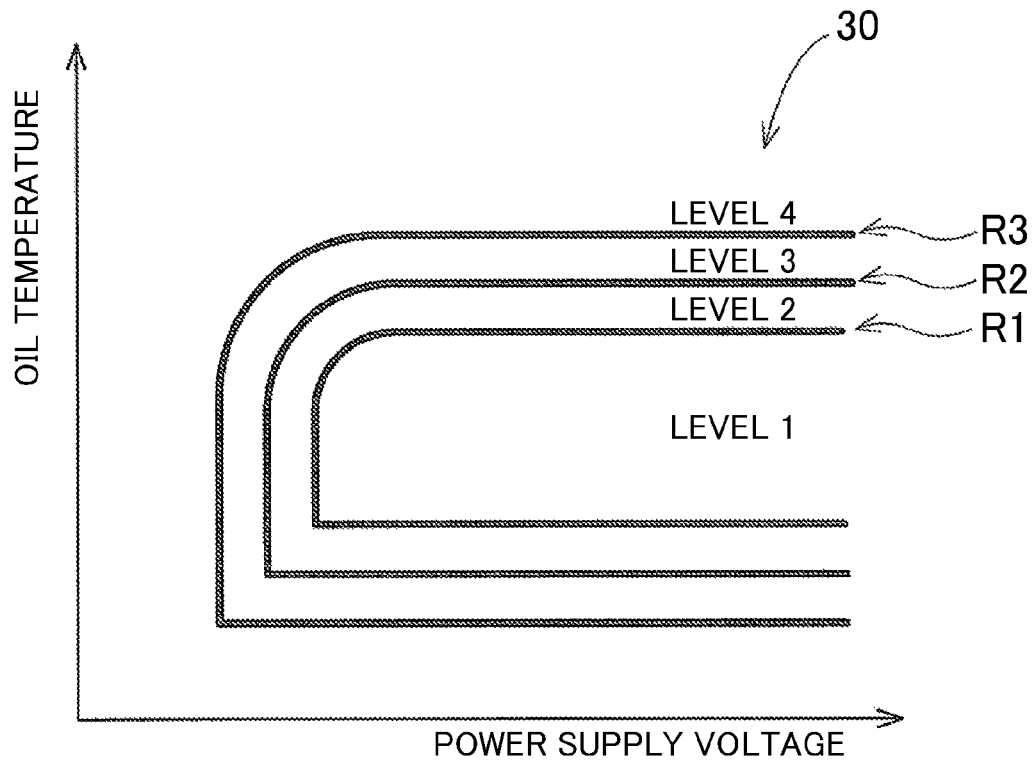
FIG. 3 is a view showing an example of a voltage-oil temperature table according to the first embodiment.

FIG. 3 is a view showing an example of the voltage-oil temperature table 30 specifying the first condition R1, the second condition R2, and the third condition R3. As shown in the figure, the first condition R1, the second condition R2, and the third condition R3 are conditions specifying boundaries of ranges specified by both of the temperature of the hydraulic oil and the voltage of the battery 16. That is, three generally U-shaped boundary lines in the drawing correspond to the first condition R1, the second condition R2, and the third condition R3 in the order from the inside. In this exemplary embodiment, in the voltage-oil temperature table 30, it is specified that a region range which satisfies the first condition R1 is level 1, a region range which does not satisfy the first condition R1 but satisfies the second condition R2 is level 2, a region range which does not satisfy the second condition R2 but satisfies the third condition R3 is level 3, and a region range which does not satisfy the third condition R3 is level 4. The levels 1 to 4 are levels showing the discharge performance of the electric pump EP in decreasing order from level 1 to level 4.

That is, according to the voltage-oil temperature table 30, the discharge performance of the electric pump EP decreases as the voltage of the battery 16 decreases and as the temperature of the hydraulic oil departs from an appropriate range (becomes high or low with respect to the temperature in the appropriate range). This shows that, as the voltage of the battery 16 decreases, the rotational driving force output by the electric motor 20 driving the electric pump EP decreases, whereby the discharge performance of the electric pump EP decreases. It also shows that, as the temperature of the hydraulic oil decreases, the viscosity of the hydraulic oil increases to increase the operation resistance of the electric pump EP, whereby the discharge performance decreases. It also shows that, as the temperature of the hydraulic oil increases, the viscosity of the hydraulic oil decreases to increase leakage of the hydraulic oil in a hydraulic pressure circuit with respect to the discharge amount of the electric pump EP, whereby the discharge performance of the electric pump EP relatively decreases.

The first condition R1 is a condition indicating a state where the discharge amount of the electric pump EP can reach a necessary amount for engaging the lock-up clutch LC so as to enable transmission of the rotational driving force from the drive power source 13 to the transmission device 15. In this exemplary embodiment, the level 1 state satisfying the first condition R1 is a state where the rotational driving force of the drive power source 13 can be transmitted to the wheel 18 side with the lock-up clutch LC and the friction engagement element C1, B1, or the like (for example, the first clutch C1 engaged in the first speed), which is to be engaged in the shift speed of the transmission device 15 at the time, in the engaged state to run the vehicle. More specifically, the first condition R1 is a condition indicating the limit of a state (for example, state of the temperature of the hydraulic oil and state of the voltage of the battery 16) where the electric pump EP can discharge the hydraulic oil in an amount which enables the lock-up clutch LC and the first clutch C1 to be engaged by the rotational driving force transmitted from the drive power source 13 so as not to slip. As shown in FIG. 3, in this example, the first condition R1 is a condition specifying a lower limit value of a voltage value of the battery 16 in accordance with the temperature of the hydraulic oil and an upper limit value and a lower limit value of the hydraulic pressure in accordance with the voltage of the battery 16. Note that, in this exemplary embodiment, when the vehicle is started or running at low speed to operate the electric pump EP, the first speed is selected as the shift speed of the transmission device 15, and the first clutch C1 comes into the engaged state. The descriptions below will be made on the premise that the first clutch C1 of the friction engagement elements C1, B1, and the like is engaged when the vehicle is started or running at low speed.

The second condition R2 is a condition indicating a state of the discharge performance of the electric pump EP being decreased compared to the first condition R1, and is a condition indicating a boundary of a predetermined safety region up to a limit state of the electric pump EP being capable of operating appropriately. In this exemplary embodiment, the level 2 state satisfying the second condition R2 is a state where the rotational driving force, transmitted from the drive power source 13 via the hydraulic oil in the torque converter 14, can be transmitted to the wheel 18, via the transmission device 15, to run the vehicle by bringing the lock-up clutch LC to the released state and bringing the first clutch C1 to the engaged state, instead of running the vehicle in the state where the lock-up clutch LC is engaged as in the level 1 state satisfying the first condition R1. More specifically, the second condition R2 is a condition indicating the state where the electric pump EP can discharge the hydraulic oil in the amount which enables the first clutch C1 to be engaged without slipping by the rotational driving force of the drive power source 13 transmitted via the torque converter 14 and the boundary of the predetermined safety region up to the limit (corresponding to the third condition R3 described later) of such state. Thus, in this example, as shown in FIG. 3, the second condition R2 is set between the third condition R3 and the first condition R1, and is specified as a boundary line having a similar and expanded shape with respect to a boundary line showing the first condition R1. That is, the second condition R2 is a condition specifying a lower limit value lower than that of the first condition for the voltage value of the battery 16 in accordance with the temperature of the hydraulic oil, and an upper limit value higher than that of the first condition R1 and a lower limit value lower than that of the first condition R1 for the hydraulic pressure in accordance with the voltage of the battery 16.

The third condition R3 is a condition indicating a state of the discharge performance of the electric pump EP being further decreased compared to the second condition R2, and is a condition indicating a state where the electric pump is at the limit of being capable of operating appropriately. In this exemplary embodiment, the state where the electric pump is at the limit of being capable of operating appropriately corresponds to a state where the discharge amount of the electric pump EP is at the limit of being able to reach the necessary amount for engaging the first clutch C1 of the transmission device 15, so as to enable transmission of the rotational driving force transmitted from the drive power source 13 via the torque converter 14 to the transmission downstream side with the lock-up clutch LC in the released state. The level 3 state satisfying the third condition R3 is a state where the rotational driving force transmitted from the drive power source 13 via the hydraulic oil in the torque converter 14 can be transmitted to the wheel 18 via the transmission device 15 to run the vehicle by bringing the lock-up clutch LC to the released state and bringing the first clutch C1 to the engaged state, in a similar manner as in the level 2 state satisfying the second condition R2. More specifically, the third condition R3 is a condition specifying the limit of the state where the electric pump EP can discharge the hydraulic oil in the amount which enables the first clutch C1 to be engaged without slipping by the rotational driving force of the drive power source 13 transmitted via the torque converter 14. Thus, in this example, as shown in FIG. 3, the third condition R3 is set further on the outside with respect to the second condition R2 (side in which the condition is unfavorable for the electric pump EP), and specifies a boundary line having a similar and expanded shape with respect to the boundary line of the second condition R2. That is, the third condition R3 is a condition specifying a lower limit value lower than that of the second condition R2 for the voltage value of the battery 16 in accordance with the temperature of the hydraulic oil, and an upper limit value higher than that of the second condition R2 and a lower limit value lower than that of the second condition R2 for the hydraulic pressure in accordance with the voltage of the battery 16.

In one exemplary embodiment, the electric pump condition determination portion 36 determines whether the first condition R1, the second condition R2, and the third condition R3 are satisfied, depending on which one of levels 1 to 4 in the voltage-oil temperature table 30 the temperature of the hydraulic oil and the voltage of the battery 16 detected by the oil temperature sensor 27 and the voltage sensor 28 fall under. That is, the electric pump condition determination portion 36 determines that the first condition R1 is satisfied in the case where the temperature of the hydraulic oil and the voltage of the battery 16 fall under level 1, determines that the first condition R1 is not satisfied but the second condition R2 is satisfied in the case where the temperature of the hydraulic oil and the voltage of the battery 16 fall under level 2, determines that the first condition R1 and the second condition R2 are not satisfied but the third condition R3 is satisfied in the case where the temperature of the hydraulic oil and the voltage of the battery 16 fall under level 3, and determines that the first condition R1, the second condition R2, and the third condition R3 are all not satisfied in the case where the temperature of the hydraulic oil and the voltage of the battery 16 fall under level 4.

Figure 4:
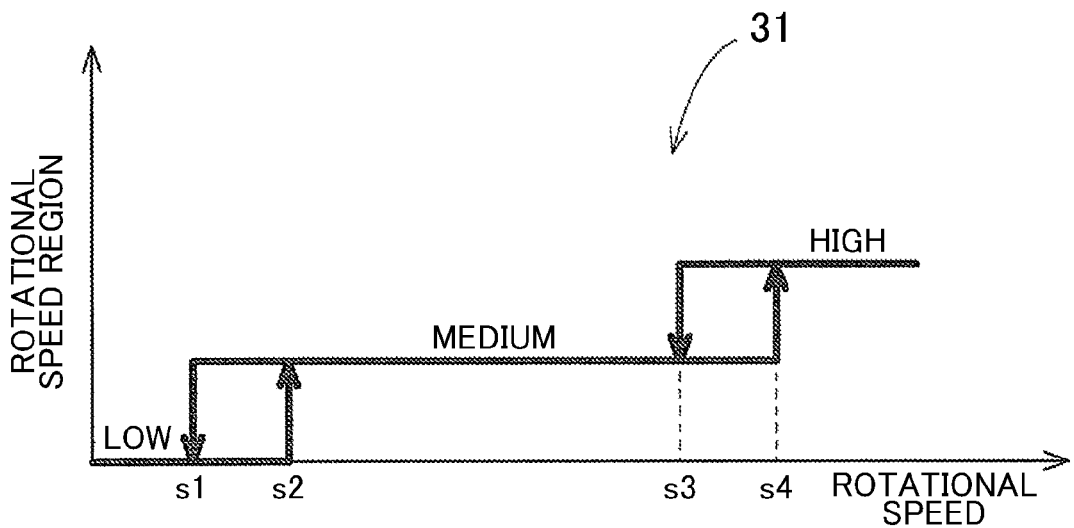
FIG. 4 is a view showing an example of a mechanical pump (MP) rotational speed table according to the first embodiment.

The MP rotational speed region determination portion 37 determines which one of a plurality of rotational speed regions the rotational speed of the mechanical pump MP falls under based on information of the rotational speed of the mechanical pump MP detected by the rotational speed sensor 25. FIG. 4 is a view showing an example of the MP rotational speed table 31 to be referenced when the MP rotational speed region determination portion 37 determines the rotational speed region. In the table, the abscissa indicates the rotational speed of the mechanical pump MP and the ordinate indicates the rotational speed region of the mechanical pump MP. As shown in the figure, in this exemplary embodiment, the MP rotational speed region determination portion 37 determines which one of the three categorized rotational speed regions of "low," "medium," and "high" the mechanical pump MP falls under. A hysteresis is provided at the boundaries of the respective rotational speed regions, whereby boundary rotational speeds in the case where the rotational speed of the mechanical pump MP is increasing are set to higher values than boundary rotational speeds in the case where the rotational speed is decreasing. The reason for providing the hysteresis in this manner is to reflect a change of the hydraulic pressure of the hydraulic oil which occurs later than the increase or decrease of the rotational speed of the mechanical pump MP in the determination of the rotational speed region of the mechanical pump MP.

Specifically, as shown in FIG. 4, in the case where the rotational speed of the mechanical pump MP is increasing, the MP rotational speed region determination portion 37 determines a rotational speed of 0 to s2 as the "low" rotational speed region, s2 to s4 as the "medium" rotational speed region, and s4 and above as the "high" rotational speed region. On the other hand, in the case where the rotational speed of the mechanical pump MP is decreasing, the MP rotational speed region determination portion 37 determines a rotational speed of s3 and above as the "high" rotational speed region, s3 to s1 as the "medium" rotational speed region, and s1 to 0 as the "low" rotational speed region. For example, it is possible to set the rotational speeds s1 and s2 to approximately an idling rotation (500 to 600 rpm) of the engine 11, and to set the rotational speeds s3 and s4 to approximately twice that rotational speed (1000 to 1200 rpm).

In this exemplary embodiment, a state where the rotational speed region of the mechanical pump MP is "high" corresponds to a state where the rotational driving force of the drive power source 13 can be transmitted to the wheel 18 side to run the vehicle with both of the lock-up clutch LC and the first clutch C1 in the engaged state by only the hydraulic oil discharged from the mechanical pump MP. A state where the rotational speed region of the mechanical pump MP is "medium" corresponds to a state where the rotational driving force transmitted from the drive power source 13 via the torque converter 14 can be transmitted to the wheel 18 side via the transmission device 15 to run the vehicle with the lock-up clutch LC in the released state and the first clutch C1 in the engaged state by only the hydraulic oil discharged from the mechanical pump MP. A state where the rotational speed region of the mechanical pump MP is "low" corresponds to a state where the necessary amount cannot be reached for engaging the first clutch C1 so as to enable transmission of the rotational driving force transmitted from the drive power source 13 via the torque converter 14 to the wheel 18 side with the lock-up clutch LC in the released state by only the hydraulic oil discharged from the mechanical pump MP. That is, the state where the rotational speed region of the mechanical pump MP is "high" corresponds to a state where a first control mode described later can be executed to run the vehicle by only the hydraulic pressure of the hydraulic oil discharged from the mechanical pump MP. The state where the rotational speed region of the mechanical pump MP is "medium" corresponds to a state where a second control mode described later can be executed to run the vehicle by only the hydraulic pressure of the hydraulic oil discharged from the mechanical pump MP. The state where the rotational speed region of the mechanical pump MP is "low" corresponds to a state where the first control mode and the second control mode described later can be executed to run the vehicle by only the hydraulic pressure of the hydraulic oil discharged from the mechanical pump MP. Thus, in this embodiment, the electric pump EP is operated in the state where the rotational speed region of the mechanical pump MP is "low" or "medium," and the electric pump EP is stopped in the state where the rotational speed region of the mechanical pump MP is "high."

The rise determination portion 38 determines whether a transient state from the start of operation of the electric pump EP until the rise of the hydraulic pressure of the hydraulic oil has passed and the rise of the hydraulic pressure of the hydraulic oil is completed. The rise determination portion 38 is provided in the control unit 24 for the following reason. That is, as shown in an example of FIG. 5, the increase of the hydraulic pressure of the hydraulic oil generally occurs later than the increase of the rotational speed of the electric pump EP. One of the causes is that, in the case where both of the mechanical pump MP and the electric pump EP are in the stopped state such as in the case where the power supply of the vehicle is turned off, the hydraulic oil in the hydraulic pressure circuit falls out in that time, whereby a certain amount of time is required to refill the hydraulic oil in the hydraulic pressure circuit. The time from the start of operation of the electric pump EP until the completion of the rise of the hydraulic pressure of the hydraulic oil (time of the transient state) changes in accordance with the amount of the hydraulic oil that has fallen out from the hydraulic pressure circuit, which increases in accordance with an elapsed time (hereinafter called "pump stopped time") during which both of the mechanical pump MP and the electric pump EP are stopped, and the viscosity of the hydraulic oil, which changes in accordance with the temperature. That is, as the pump stopped time increases, the amount of the hydraulic oil falling out of the hydraulic pressure circuit increases, whereby the time until the completion of the hydraulic pressure rise increases. As the temperature of the hydraulic oil decreases, the viscosity of the hydraulic oil increases to increase the operation resistance of the electric pump EP, whereby the time until the completion of the rise of the hydraulic pressure increases. Conversely, as the temperature of the hydraulic oil increases, the viscosity of the hydraulic oil decreases to increase leakage of the hydraulic oil in the hydraulic pressure circuit with respect to the discharge amount of the electric pump EP, whereby the time until the completion of the rise of the hydraulic pressure similarly increases.

Figure 5:
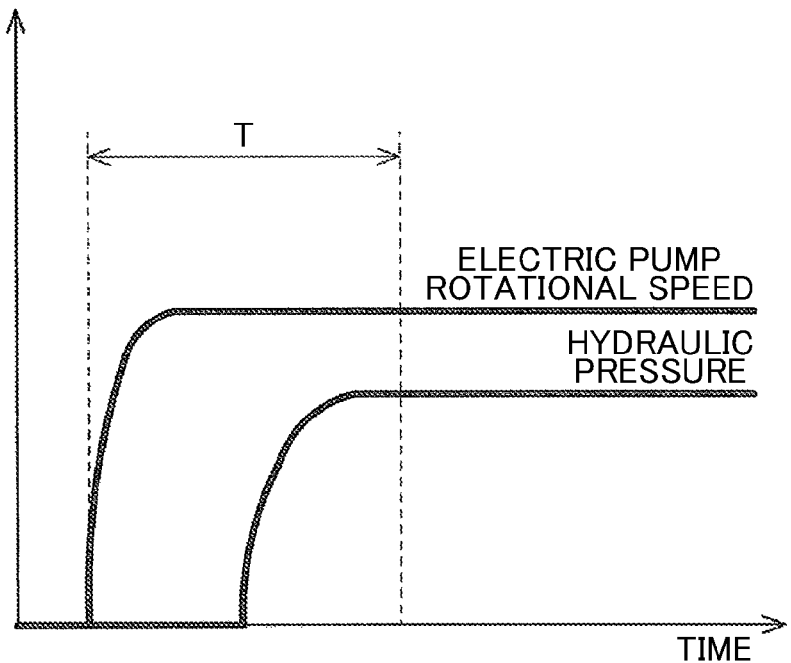
FIG. 5 is an illustrative view showing an example of a state where hydraulic pressure of hydraulic oil increases later than the increase of rotational speed of the electric pump.

In this embodiment, the rise determination portion 38 obtains an expected time T from the start of operation of the electric pump EP until the completion of the rise of the hydraulic pressure of the hydraulic oil (hereinafter simply called "expected time T"), as shown in FIG. 5, based on the pump stopped time and the temperature of the hydraulic oil, and determines that the rise is completed when the expected time T has elapsed.

Figure 6:
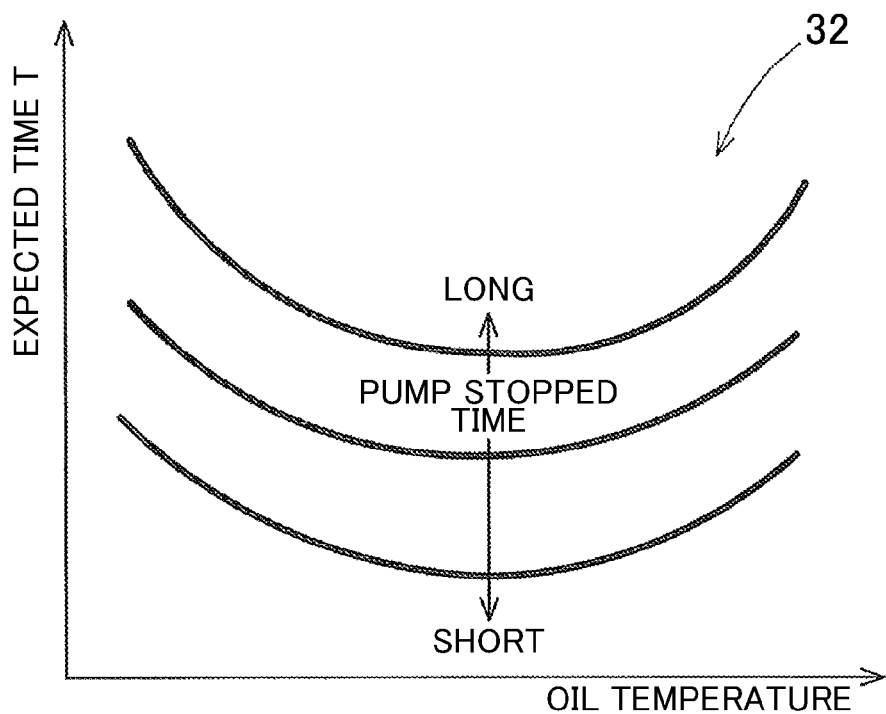
FIG. 6 is a view showing an example of an expected rise time table according to the first embodiment.

FIG. 6 is a view showing an example of the expected rise time table 32 referenced when the expected time T is obtained by the rise determination portion 38. As shown in the figure, the expected rise time table 32 specifies that the expected time T increases as the pump stopped time increases and as the temperature of the hydraulic oil increases or decreases with respect to a predetermined temperature. In one exemplary embodiment, the expected time T in the expected rise time table 32 is specified using a value experimentally obtained for each vehicle or each vehicle type. Note that the pump stopped time is measured by a timer or the like. The temperature of the hydraulic oil is detected by the oil temperature sensor 27. As described later, the control unit 24 performs the determination by the electric pump condition determination portion 36 on whether the respective conditions R1 to R3 are satisfied after the rise determination portion 38 has determined that the rise of the hydraulic pressure of the hydraulic oil is completed.

The EP failure detection portion 39 detects a failure of the electric pump EP. Examples electric pump EP failure are a failure of the electric motor 20 which drives the electric pump EP, a failure of the driver 34 which drives the electric motor 20, and the like. There are various methods of detecting the failure of the electric pump EP. In this exemplary embodiment, it is determined that the electric pump EP has failed when the rotational speed of the electric pump EP detected by the EP rotation sensor 26 differs from the rotational speed of the electric pump EP in accordance with the control signal output from the control unit 24 to the driver 34 by a predetermined threshold value or more. As described later, in the case where the failure of the electric pump EP is detected by the EP failure detection portion 39, the control mode decision portion 40 selects a fourth control mode.

The control mode decision portion 40 performs decision on the control mode to be executed by the control unit 24, based on a determination result by the electric pump condition determination portion 36 and the MP rotational speed region determination portion 37 and a detection result by the EP failure detection portion 39. In this embodiment, the control mode decision portion 40 selects and decides one of five modes: a running mode, the first control mode, the second control mode, a third control mode, and the fourth control mode. The running mode is a control mode selected while the vehicle is running normally, and is a mode selected in the case where the MP rotational speed region determination portion 37 determines that the rotational speed region of the mechanical pump MP is "high," i.e., during the running state in which the rotational speed of the input shaft 21 is high to a certain extent. In the running mode, the electric pump EP is stopped, and the operation of the lock-up clutch LC and the friction engagement elements C1, B1, and the like of the transmission device 15 is performed by the hydraulic oil discharged from the mechanical pump MP. The selection of the shift speed of the transmission device 15 and the engagement, release, or the like of the lock-up clutch LC are performed in accordance with the vehicle speed, requested driving force, or the like.

The first to fourth control modes are control modes selected when the vehicle is started or running at low speed, and are modes selected in the case where the MP rotational speed region determination portion 37 determines that the rotational speed region of the mechanical pump MP is "low" or "medium," i.e., while the electric pump EP is operating. The control mode decision portion 40 selects one of the first to fourth control modes based on the determination result by the electric pump condition determination portion 36. For example, the first control mode is selected in the case where it is determined that the first condition R1 is satisfied (level 1), the second control mode is selected in the case where the first condition R1 is not satisfied but the second condition R2 is satisfied (level 2), the third control mode is selected in the case where the second condition R2 is not satisfied but the third condition R3 is satisfied (level 3), and the fourth control mode is selected in the case where the third condition R3 is not satisfied (level 4). The control mode decision portion 40 selects the fourth control mode also in the case where the failure of the electric pump EP is detected by the EP failure detection portion 39. Note that the procedure of deciding the control mode will be described later in detail using a flowchart.

In this exemplary embodiment, the first control mode permits the engagement of both of the lock-up clutch LC and the first clutch C1 (as one example of the friction engagement element C1, B1, or the like to be engaged in the shift speed of the transmission device 15 at the time). The second control mode inhibits the engagement of the lock-up clutch LC and permits the engagement of the first clutch C1. The third control mode stops the electric pump EP after the rotational speed of the mechanical pump MP has become greater than or equal to the predetermined threshold value, while executing the second control mode. The fourth control mode immediately stops the electric pump EP and shifts to the second control mode after the rotational speed of the mechanical pump MP has become greater than or equal to the predetermined threshold value. In the fourth control mode, the engagement of both of the lock-up clutch LC and the first clutch C1 are inhibited until the rotational speed of the mechanical pump MP becomes greater than or equal to the predetermined threshold value. That is, in the second control mode, the third control mode, and the fourth control mode other than the first control mode, the second control mode is eventually executed.

As described above, the state where the electric pump condition determination portion 36 has determined that the first condition R1 is satisfied (level 1) can be determined as a state where the discharge amount of the electric pump EP is sufficiently large so that the lock-up clutch LC and the first clutch C1 can be engaged so as to enable transmission of the rotational driving force from the drive power source 13. Thus, in one exemplary embodiment, the control mode decision portion 40 selects the first control mode. As a result, the control unit 24 brings the lock-up clutch LC and the first clutch C1 to the engaged state. Accordingly, the torque converter 14 comes into a directly-connected state without intervention of the hydraulic oil, and the transmission device 15 is set to the first speed. When the electric pump EP is in operation and the vehicle is started or running at low speed, the transmission clutch TC is in the released state, and only the rotating electrical machine 12 is in a state of outputting the driving force. In the first control mode, the rotational driving force of the drive power source 13 is directly transmitted to the transmission device 15 via the torque converter 14, and is shifted at the transmission gear ratio of the first speed by the transmission device 15 to be transmitted to the wheel 18 side, whereby the running state is achieved.

In one exemplary embodiment, the state where the electric pump condition determination portion 36 has determined that the first condition R1 is not satisfied but the second condition R2 is satisfied (level 2) can be determined as a state where the discharge amount of the electric pump EP is relatively small whereby the lock-up clutch LC cannot be engaged so as to enable transmission of the rotational driving force from the drive power source 13, but the first clutch C1 can be engaged so as to enable transmission of the rotational driving force transmitted from the drive power source 13 via the hydraulic oil in the torque converter 14. Thus, the control mode decision portion 40 selects the second control mode. Accordingly, the control unit 24 brings the lock-up clutch LC to the released state and the first clutch C1 to the engaged state. Accordingly, the torque converter 14 comes into a state of transmitting the rotational driving force via the hydraulic oil, and the transmission device 15 is set to the first speed. When the electric pump EP is in operation and the vehicle is started or running at low speed, the transmission clutch TC is in the released state, and only the rotating electrical machine 12 is in the state of outputting the driving force. In the second control mode, the rotational driving force of the drive power source 13 is transmitted to the transmission device 15 via the torque converter 14. In this case, the rotational driving force is transmitted to the first clutch C1 of the transmission device 15 after the rotational speed of the input shaft 21 and the mechanical pump MP has been increased by the slippage of the torque converter 14. Thus, when the rotational driving force transmitted to the first clutch C1 actually increases, the hydraulic oil from the mechanical pump MP which has increased in the rotational speed is supplied to the first clutch C1. Thus, the transmission torque capacity of the first clutch C1 at the start of the execution of the second control mode may be small.

In another exemplary embodiment, the state where the electric pump condition determination portion 36 has determined that the second condition R2 is not satisfied but the third condition R3 is satisfied (level 3) can be determined as a state where the electric pump is at the limit of being capable of operating appropriately, and as a state where the lock-up clutch LC cannot be engaged so as to enable transmission of the rotational driving force from the drive power source 13, and the first clutch C1 is close to the limit of being capable of engaging so as to enable transmission of the rotational driving force transmitted from the drive power source 13 via the hydraulic oil in the torque converter 14. Thus, the control mode decision portion 40 selects the third control mode. Accordingly, the control unit 24 performs the control of stopping the electric pump EP after the rotational speed of the mechanical pump MP has become greater than or equal to the predetermined threshold value, while executing the second control mode. This is a control for protecting the electric pump EP against excess load while avoiding trouble in executing the second control mode, since the state is such that the load is large whereby the discharge performance of the electric pump EP is close to the limit. By executing the third control mode, the electric pump EP is protected against excess load while preventing the occurrence of a pressure drop of the hydraulic oil due to the stoppage of the electric pump EP during the execution of the second control mode.

The state where the electric pump condition determination portion 36 has determined that the third condition R3 is not satisfied (level 4) can be determined as a state where the electric pump EP cannot operate appropriately, and as a state where the lock-up clutch LC and the first clutch C1 cannot be engaged so as to enable transmission of the rotational driving force from the drive power source 13. Thus, the control mode decision portion 40 selects the fourth control mode. Accordingly, the control unit 24 immediately causes the electric pump EP to stop, and shifts to the second control mode after the rotational speed of the mechanical pump MP has become greater than or equal to the predetermined threshold value. This is control which prioritizes the protection of the electric pump EP against excess load, since the state is such that the load is extremely large whereby the electric pump EP cannot operate appropriately. By executing the fourth control mode, the pressure drop of the hydraulic oil occurs due to the stop of the electric pump EP, but the protection of the electric pump EP against excess load can appropriately be performed.

Figure 7:
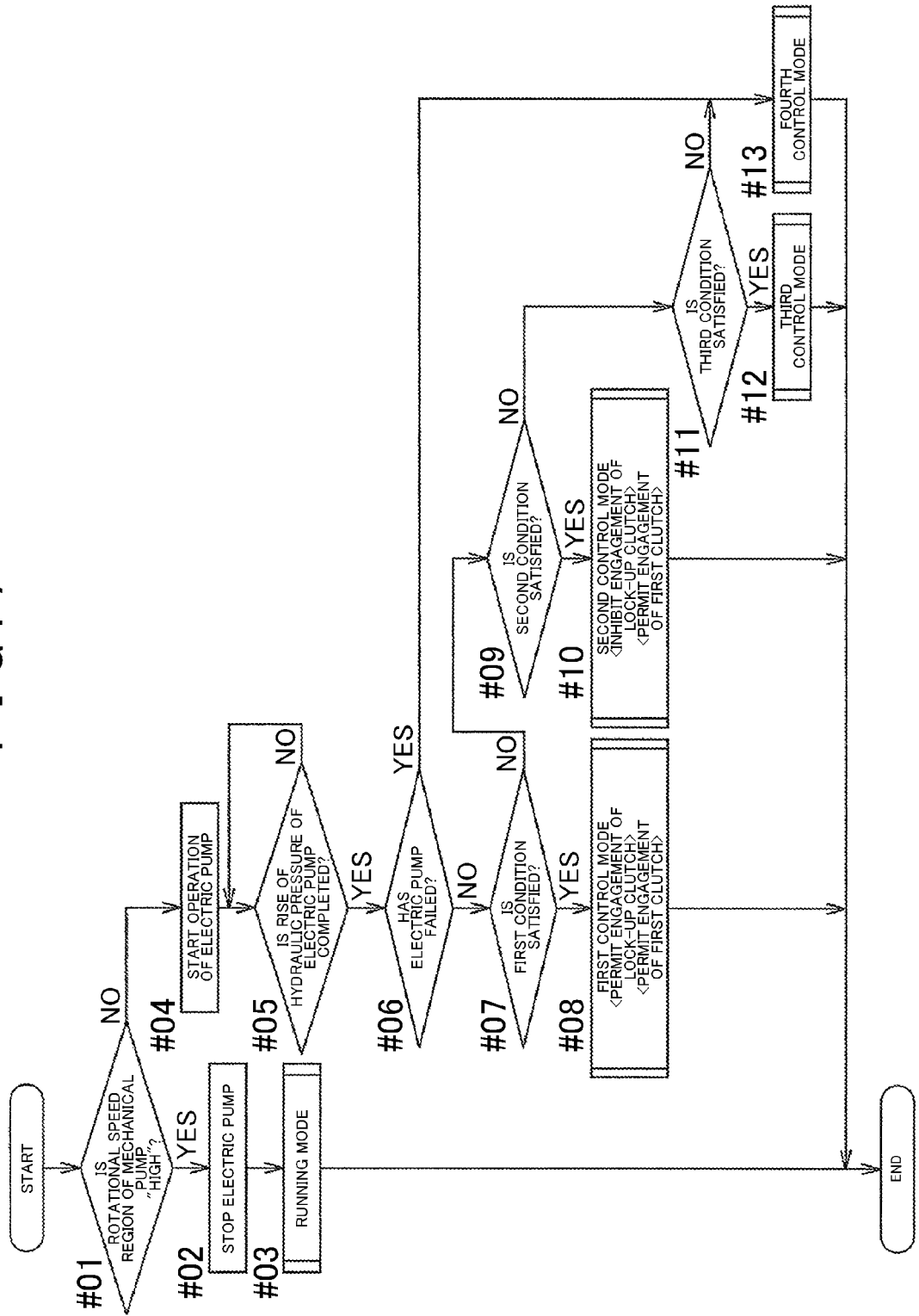
FIG. 7 is a flowchart showing an example of the decision process of a control mode by the vehicle control device according to the first exemplary embodiment.
Figure 8:
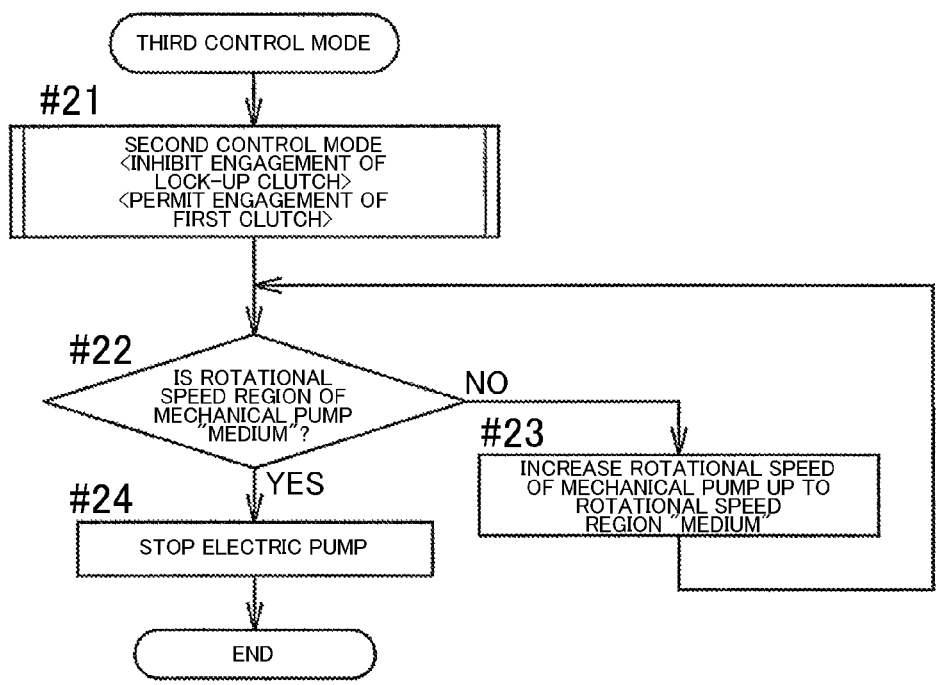
FIG. 8 is a flowchart showing a process of a third control mode in operation #12 of the exemplary embodiment illustrated in FIG. 7.
Figure 9:
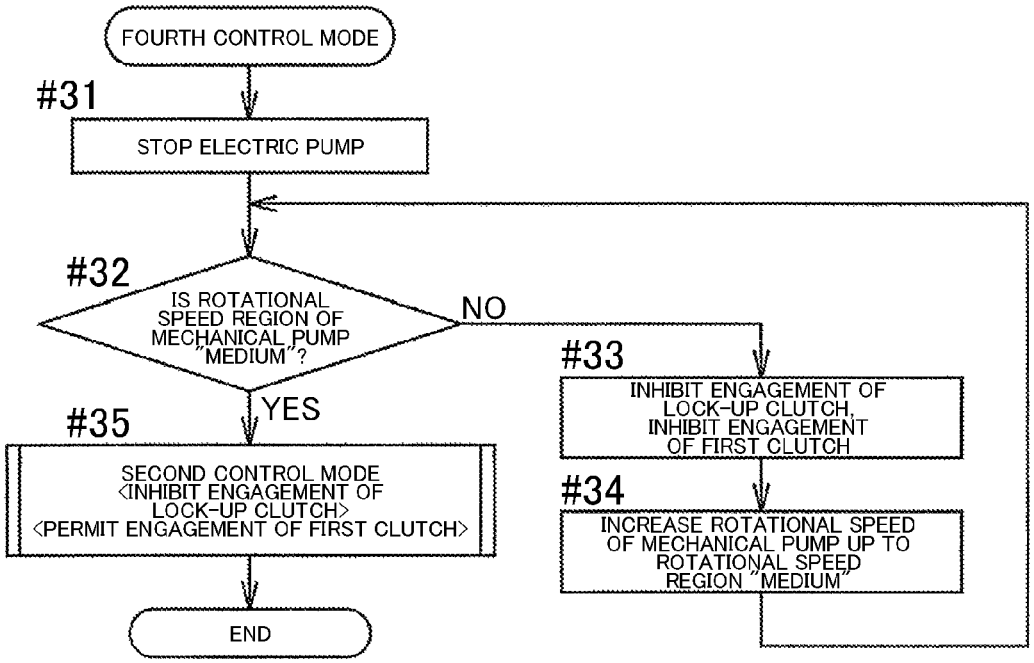
FIG. 9 is a flowchart showing a process of a fourth control mode in operation #13 of the exemplary embodiment illustrated in FIG. 7.

1-4. Content of Control by Vehicle Control Device in Accordance with One Exemplary Embodiment FIG. 7 is a flowchart showing an exemplary embodiment of a decision process of the control mode by the vehicle control device 1. FIG. 8 is a flowchart showing a process of the third control mode of operation #12 of the exemplary embodiment illustrated in FIG. 7. FIG. 9 is a flowchart showing a process of the fourth control mode of operation #13 of the exemplary embodiment illustrated in FIG. 7. The process of the vehicle control device 1 described below is executed by the respective functional portions 36 to 40 of the control unit 24. In the case where the respective functional portions 36 to 40 of the control unit 24 are structured by programs, the arithmetic processing device included in the control unit 24 operates as a computer which executes the programs structuring the respective functional portions 36 to 40 described above.

In the decision process of the control mode according to this embodiment, the control unit 24 first determines whether the current rotational speed region of the mechanical pump MP is "high" (#01) using the MP rotational speed region determination portion 37. In the case where the rotational speed region of the mechanical pump MP is "high" (#01: Yes), the control unit 24 stops the electric pump EP (#02). The stop of the electric pump EP is performed by outputting a stop command of the electric motor 20 from the control unit 24 to the driver 34. Note that, in the case where the electric pump EP is already in the stopped state, that state is maintained. The control mode decision portion 40 selects and decides the running mode (#03). The running mode is executed by the control unit 24.

On the other hand, in the case where the rotational speed region of the mechanical pump MP is not "high," i.e., in the case where the rotational speed region of the mechanical pump MP determined by the MP rotational speed region determination portion 37 is "low" or "medium" (#01: No), the operation of the electric pump EP is started (#04). The start of operation of the electric pump EP is performed by outputting an operation command of the electric motor 20 from the control unit 24 to the driver 34. Note that, in the case where the electric pump EP is already in an operating state, that state is maintained. Next, the rise determination portion 38 determines whether the rise of the hydraulic pressure of the electric pump EP is completed (#05). In the case where the elapsed time from the start of operation of the electric pump EP is short and the rise of the hydraulic pressure of the hydraulic oil is not completed (#05: No), the control module continues to wait. In the case where the rise of the hydraulic pressure of the electric pump EP is completed (#05: Yes), a failure detection check of the electric pump EP is then performed by the EP failure detection portion 39 (#06). In the case where the failure of the electric pump EP is detected (#06: Yes), the control mode decision portion 40 selects the fourth control mode (#13).

In the case where the failure of the electric pump EP is not detected (#06: No), the electric pump condition determination portion 36 then determines whether the temperature of the hydraulic oil detected by the oil temperature sensor 27 and the voltage of the battery 16 detected by the voltage sensor 28 satisfy the first condition R1 (#07). In the case where the first condition R1 is satisfied (#07: Yes), the control mode decision portion 40 selects the first control mode (#08). The first control mode is also executed by the control unit 24. As described above, in the first control mode, the engagement of both of the lock-up clutch LC and the first clutch C1 is permitted. On the other hand, in the case where the first condition R1 is not satisfied (#07: No), the electric pump condition determination portion 36 then determines whether the temperature of the hydraulic oil and the voltage of the battery 16 satisfy the second condition R2 (#09). In the case where the second condition R2 is satisfied (#09: Yes), the control mode decision portion 40 selects the second control mode (#10). The second control mode is executed by the control unit 24. As described above, in the second control mode, the engagement of the lock-up clutch LC is inhibited and the engagement of the first clutch C1 is permitted.

On the other hand, in the case where the second condition R2 is not satisfied (#09: No), the electric pump condition determination portion 36 then determines whether the temperature of the hydraulic oil and the voltage of the battery 16 satisfy the third condition R3 (#11). In the case where the third condition R3 is satisfied (#11: Yes), the control mode decision portion 40 selects the third control mode (#12). The third control mode is executed by the control unit 24. The process of the third control mode will be described later based on the flowchart shown in FIG. 8. On the other hand, in the case where the third condition R3 is not satisfied (#11: No), the control mode decision portion 40 selects the fourth control mode (#13). The fourth control mode is executed by the control unit 24. The process of the fourth control mode will be described later based on the flowchart shown in FIG. 9. The entire procedure of the decision process of the control mode is thus ended.

Next, the process of the third control mode of operation #12 of the exemplary embodiment of FIG. 7 will be described. When executing the third control mode, the control unit 24 first executes the second control mode (#21). Next, the MP rotational speed region determination portion 37 determines whether the current rotational speed region of the mechanical pump MP is "medium" (#22). As described above, the state where the rotational speed region of the mechanical pump MP is "medium" corresponds to a state where the second control mode can be executed to run the vehicle by only the hydraulic pressure of the hydraulic oil discharged from the mechanical pump MP. Thus, in the case where the rotational speed region of the mechanical pump MP is "medium" (#22: Yes), the control unit 24 readily stops the electric pump EP (#24). On the other hand, in the case where the rotational speed region of the mechanical pump MP is not "medium" (#22: No), it can be judged that the rotational speed region of the mechanical pump MP is "low." Therefore, the rotational speed of the mechanical pump MP is increased until the rotational speed region becomes "medium" (#23). In this embodiment, the rotational speed of the mechanical pump MP at which the rotational speed region becomes "medium" or higher corresponds to the predetermined threshold value of the present invention. Then, the control unit 24 stops the electric pump EP (#24) after the rotational speed region of the mechanical pump MP has become "medium" (#22: Yes). The process of the third control mode is thus ended. Accordingly, the occurrence of the pressure drop of the hydraulic oil due to the electric pump EP stopping while the second control mode is being executed can be prevented, and the electric pump EP can be protected against excess load.

Next, the process of the fourth control mode of operation #13 of the exemplary embodiment illustrated in FIG. 7 will be described. When executing the fourth control mode, the control unit 24 first immediately stops the electric pump EP (#31) for protection of the electric pump EP against excess load. Next, the MP rotational speed region determination portion 37 determines whether the current rotational speed region of the mechanical pump MP is "medium" (#32). In the case where the rotational speed region of the mechanical pump MP is "medium" (#32: Yes), the second control mode is readily executed (#35) since the second control mode can be executed to run the vehicle by only the hydraulic pressure of the hydraulic oil discharged from the mechanical pump MP.

On the other hand, in the case where the rotational speed region of the mechanical pump MP is not "medium" (#32: No), it can be judged that the rotational speed region of the mechanical pump MP is "low." In this case, since the electric pump EP is already stopped, there is no mechanism to ensure the hydraulic pressure for performing the engagement of the lock-up clutch LC and the first clutch C1. Thus, the engagement of both of the lock-up clutch LC and the first clutch C1 is inhibited (#33). Then, the rotational speed of the mechanical pump MP is increased until the rotational speed region becomes "medium" (#34). In this exemplary embodiment, the rotational speed of the mechanical pump MP at which the rotational speed region becomes "medium" or higher corresponds to the predetermined threshold value of the present invention. The inhibition of the engagement of both of the lock-up clutch LC and the first clutch C1 is continued until the rotational speed region of the mechanical pump MP becomes "medium." Then, the control unit 24 executes the second control mode (#35) after the rotational speed region of the mechanical pump MP has become "medium" (#32: Yes). The process of the fourth control mode is thus ended. Accordingly, the electric pump EP is protected against excess load in a state where the load is extremely large such that the electric pump EP cannot be operated appropriately.

2. Second Embodiment

Next, a second exemplary embodiment of the present invention will be described. The vehicle drive device 2, to which the vehicle control device 1 according to this embodiment is applied, is applied in a similar manner as in the first exemplary embodiment, and the hardware configuration of the hydraulic control device 3 is also similar to that of the first exemplary embodiment. On the other hand, the vehicle control device 1 according to this exemplary embodiment differs from that of the first exemplary embodiment by the method of determining conditions R1 to R3 by the electric pump condition determination portion 36 of the control unit 24 shown in FIG. 2, and in the configuration of the table used for the determination of the conditions R1 to R3. The differences from the first exemplary embodiment will be described below. Note that the configurations of this exemplary embodiment are similar to those of the first embodiment unless otherwise stated in particular.

The present exemplary embodiment differs from the first exemplary embodiment in that the temperature of the electric motor 20 driving the electric pump EP is the factor influencing the discharge performance of the electric pump EP. Therefore the vehicle control device 1 according to this exemplary embodiment includes a temperature sensor which detects the temperature of the electric motor 20. Temperature of the electric motor 20 detected by the temperature sensor, a case temperature, a stator temperature, or the like of the electric motor 20 may be used, for example. The vehicle control device 1 includes an electric pump temperature table (hereafter called "EP temperature table"), instead of the voltage-oil temperature table 30 in the first embodiment described above, stored in the table storage portion 29.

FIG. 10 is a view showing an example of the EP temperature table according to this embodiment. In FIG. 10, the abscissa shows the temperature of the electric motor 20 for driving the electric pump EP, and the ordinate shows the level of the discharge performance of the electric pump EP. The electric pump condition determination portion 36 references the EP temperature table and determines the level of the discharge performance of the electric pump EP in accordance with the temperature of the electric motor 20 detected by the temperature sensor. The temperature of the electric motor 20 that drives the electric pump EP increases as the load of the electric pump EP increases. The discharge performance of the electric pump EP decreases as the load of the electric pump EP increases. Thus, the electric pump condition determination portion 36 can determine the discharge performance of the electric pump EP at the time based on the temperature of the electric motor 20 at respective time points by referencing the EP temperature table.

In this exemplary embodiment, the electric pump condition determination portion 36 determines the discharge performance level of the electric pump EP as one of four categories of level 1 to level 4, in a similar manner as in the first exemplary embodiment described above. The discharge performance levels show the state of the discharge performance of the electric pump EP in decreasing order from level 1 to level 4. A hysteresis is provided at the boundaries of the respective levels, whereby boundary temperatures when the temperature of the electric motor 20 is increasing are set to higher values than boundary temperatures when the temperature is decreasing. Thus, as shown in FIG. 10, in the case where the temperature of the electric motor 20 is increasing, the electric pump condition determination portion 36 determines a temperature of less than t2 as level 1, t2 to t4 as level 2, t4 to t6 as level 3, and t6 and above as level 4. On the other hand, in the case where the temperature of the electric motor 20 is decreasing, the electric pump condition determination portion 36 determines a temperature of t5 and above as level 4, t5 to t3 as level 3, t3 to t1 as level 2, and less than t1 as level 1. Thus, in this exemplary embodiment, the temperature range between the boundary temperatures t1 and t2 of the electric motor 20 between level 1 and level 2 corresponds to the first condition R1, the temperature range between the boundary temperatures t3 and t4 of the electric motor 20 between level 2 and level 3 corresponds to the second condition R2, and the temperature range between the boundary temperatures t5 and t6 of the electric motor 20 between level 3 and level 4 corresponds to the third condition R3.

In a similar manner as in the first exemplary embodiment described above, the first condition R1 of this exemplary embodiment is a condition specifying the state where the discharge amount of the electric pump EP can reach the necessary amount for engaging the lock-up clutch LC so as to enable transmission of the rotational driving force from the drive power source 13 to the transmission device 15. Thus, the boundary temperatures t1 and t2 of the electric motor 20 are set to a temperature corresponding to such discharge state of the electric pump EP. The second condition R2 of this exemplary embodiment is a condition specifying the state of the discharge performance of the electric pump EP being decreased compared to the first condition R1, and is a condition specifying the boundary of the predetermined safety region up to the limit within which the electric pump EP can operate appropriately. Thus, the boundary temperatures t3 and t4 of the electric motor 20 are set to a temperature corresponding to such discharge state of the electric pump EP. The third condition R3 of this exemplary embodiment is a condition specifying the state of the discharge performance of the electric pump EP being further decreased compared to the second condition R2, and is a condition specifying the state where the electric pump EP is at the limit of operating appropriately. Thus, the boundary temperatures t5 and t6 of the electric motor 20 are set to a temperature corresponding to a discharge state of the electric pump EP. In one exemplary embodiment, the boundary temperatures t1 to t6 of the EP temperature table, corresponding to the discharge states of the electric pump EP described above, can be appropriately set by experimentally obtaining the relation of the discharge state (discharge performance) of the electric pump EP and the temperature of the electric motor 20 under the same condition as that of an actual usage state of the electric pump EP and the electric motor 20.

In a similar manner as in the first exemplary embodiment described above, the control mode determination portion 40 selects one of the first to fourth control modes based on the determination result by the electric pump condition determination portion 36 of this embodiment. The procedure of the decision method and the content of the respective control modes are similar to those of the first exemplary embodiment described above.

The case where the temperature of the electric motor 20 is the factor influencing the discharge performance of the electric pump EP and where the electric pump condition determination portion 36 determines the discharge performance level of the electric pump EP based on the electric pump temperature table has been described above. However, the temperature of the driver 34 of the electric motor 20 driving the electric pump EP may also be the factor influencing the discharge performance of the electric pump EP, in a similar manner as the temperature of the electric motor 20. Thus, in one exemplary embodiment it is also possible for the vehicle control device 1 to include a temperature sensor which detects the temperature of the driver 34 and to include a driver temperature table in the table storage portion 29, and further be structured such that the electric pump condition determination portion 36 determines the discharge performance level of the electric pump EP in accordance with the temperature of the driver 34. In such an exemplary embodiment, the content of the driver temperature table may be a table similar to the EP temperature table described above, in which only the values of the boundary temperatures t1 to t6 are different.

In another exemplary embodiment, the vehicle control device 1 may be structured to include both of the temperature sensor which detects the temperature of the electric motor 20 and the temperature sensor which detects the temperature of the driver 34 and to include both of the EP temperature table and the driver temperature table in the table storage portion 29, and to further be structured such that the electric pump condition determination portion 36 determines the discharge performance level of the electric pump EP in accordance with both the temperature of the electric motor 20 and the temperature of the driver 34. In this case, for example, the electric pump condition determination portion 36 may be structured to determine either the discharge performance level of the electric pump EP determined in accordance with the temperature of the electric motor 20 or the discharge performance level of the electric pump EP determined in accordance with the temperature of the driver 34, whichever is lower, as the discharge performance level of the electric pump EP at the time.

3. Other Embodiments (1) In the respective exemplary embodiments described above, the case where the transmission device 15 is a stepped automatic transmission has been described above as an example. However, embodiments of the present invention are not limited thereto. Thus, for example, a continuously variable transmission such as a belt CVT may be used as the drive transmission mechanism in another exemplary embodiment of the present invention. For example, in the case where the belt CVT is used, respective pulleys on the driving side and the driven side which receive supply of hydraulic pressure of hydraulic oil to operate and are pressed against the side surface of a transmission belt to be engaged correspond to the shift engagement element. As the drive transmission mechanism, a speed reducer, a speed increaser, or the like having a fixed transmission gear ratio other than the transmission device capable of changing the transmission gear ratio may be used, for example.

(2) In the first exemplary embodiment described above, the case where the temperature of the hydraulic oil and the voltage of the battery 16 which is the power supply of the electric pump EP are the factors influencing the discharge performance of the electric pump EP and where the first condition R1, the second condition R2, and the third condition R3 are conditions of the range specified by both of the temperature of the hydraulic oil and the voltage of the battery 16 has been described as an example. However, embodiments of the present invention are not limited thereto. Thus, for example, only the temperature of the hydraulic oil may be the factor influencing the discharge performance of the electric pump EP, and the first condition R1, the second condition R2, and the third condition R3 may be conditions specifying the temperature range of the hydraulic oil in another exemplary embodiment of the present invention. In this exemplary embodiment, the respective conditions R1 to R3 may be temperature ranges corresponding to the respective conditions R1 to R3 in the ordinate direction at a normal voltage value in FIG. 3. Also, for example, only the voltage of the battery 16 which is the power supply of the electric pump EP may be the factor influencing the discharge performance of the electric pump EP, and the first condition R1, the second condition R2, and the third condition R3 may be conditions specifying the voltage range of the battery 16 in another exemplary embodiment of the present invention. In this case, the respective conditions R1 to R3 may be voltage ranges (ranges specifying only the lower limit value) corresponding to the respective conditions R1 to R3 in the abscissa direction at a normal oil temperature value in FIG. 3, for example.

(3) In the first exemplary embodiment described above, the case where the temperature of the hydraulic oil and the voltage of the power supply (battery 16) of the electric pump EP are the factors influencing the discharge performance of the electric pump EP has been described. In the second exemplary embodiment described above, the case where the temperature of at least one of the driving electric motor (electric motor 20) of the electric pump EP and the driver 34 of the driving electric motor is the factor influencing the discharge performance of the electric pump EP has been described. However, the factors influencing the discharge performance of the electric pump EP are not limited thereto, and other factors may be used for a condition determination by the electric pump condition determination portion 36. Such factors, may include for example, the viscosity of the hydraulic oil, the rotational speed of the electric pump EP, the used time (age degradation) of the electric pump EP, or the like may be used for the condition determination, or a combination of a plurality of factors selected from the mentioned factors, the temperature of the hydraulic oil, the voltage of the power supply of the electric pump EP, the temperature of the driving electric motor of the electric pump EP, and the temperature of the driver of the driving electric motor may be used for the condition determination.

(4) In the respective exemplary embodiments described above, the case where the first clutch C1 of the friction engagement elements C1, B1, and the like is engaged when the vehicle is started or running at low speed to operate the electric pump EP has been described as an example. However, there are cases where a friction engagement element of the plurality of friction engagement elements C1, B1, and the like of the transmission device 15 other than the first clutch C1 is engaged, or where the first clutch C1 and one or more of the other friction engagement elements are engaged. In such cases, it is possible to treat the one or more friction engagement elements C1, B1, and the like as being engaged during the operation of the electric pump EP in a similar manner to the first clutch C1 described above to carry out embodiments of the present invention. Also, for example, there may be cases where different shift speeds are selected in the transmission device 15 during acceleration and deceleration, even when the vehicle is running at low speed. In those cases as well, it is possible to treat the friction engagement element C1, B1, or the like as being engaged at the time in a similar manner to the first clutch C1 to carry out the embodiment of the present invention.

(5) In the respective exemplary embodiments described above, the case where the vehicle control device 1 according to the present invention is applied to the vehicle drive device 2 for a hybrid vehicle has been described as an example. However, the application range of the vehicle control device 1 according to the present invention is not limited thereto, and it may be applied without limitation to vehicle drive devices for various vehicles. For example, the vehicle control device may be applied to an electric vehicle having only a rotating electrical machine as the drive power source, a vehicle having only an engine as the drive power source, and the like.

The present invention can be suitably used as a vehicle control device for various vehicles such as a hybrid vehicle and an electric vehicle, for example.

It is contemplated that numerous modifications may be made to the exemplary embodiments of the invention without departing from the spirit and scope of the embodiments of the present invention as defined in the following claims.

What is claimed is:

1. A vehicle control device comprising:
   an input member drive-connected to a drive power source;
   a mechanical pump which operates by rotational driving force of the input member;
   an electric pump which assists the mechanical pump;
   a drive transmission mechanism which transmits the rotational driving force of the input member to an output member;
   a fluid coupling provided between the input member and the drive transmission mechanism and including a lock-up engagement element which receives hydraulic oil discharged from the mechanical pump and the electric pump to operate;
   a state detection unit that detects the state of one or more factors influencing a discharge performance of the electric pump; and
   a control unit which executes a first control mode or a second control mode, wherein the first control mode permits engagement of the lock-up engagement element if a predetermined first condition is satisfied based on the one or more factors detected by the state detection unit, and wherein a second control mode inhibits engagement of the lock-up engagement element if the first condition is not satisfied based on the one or more factors detected by the state detection unit.

2. The vehicle control device according to claim 1, wherein the first condition represents a state where a discharge amount of the electric pump is sufficient for engaging the lock-up engagement element so as to enable transmission of rotational driving force from the drive power source to the drive transmission mechanism.

3. The vehicle control device according to claim 1, wherein:
   the drive transmission mechanism comprises a shift engagement element;
   the first control mode permits engagement of both of the lock-up engagement element and the shift engagement element; and
   the second control mode inhibits engagement of the lock-up engagement element and permits engagement of the shift engagement element.

4. The vehicle control device according to claim 3, wherein the control unit executes a third control mode, wherein the third control mode stops the electric pump after a rotational speed of the mechanical pump has become greater than or equal to a predetermined operation threshold value and executes the second control mode if a predetermined second condition is not satisfied based on the detection result of the state detection unit, wherein the predetermined second condition represents a state where the discharge performance of the electric pump is decreased compared to the first condition for the one or more factors the state of which is detected by the state detecting unit.

5. The vehicle control device according to claim 4, wherein the second condition is a condition specifying a boundary of a predetermined safety region up to a state where the electric pump is at a limit of operating appropriately.

6. The vehicle control device according to claim 3, wherein the control unit executes a fourth control mode and immediately stops the electric pump, and wherein the control unit executes the second control mode after the rotational speed of the mechanical pump has become greater than or equal to the predetermined operation threshold value if a predetermined third condition is not satisfied based on the detection result of the state detection unit, wherein the predetermined third condition represents a state where the one or more factors the state of which is detected by the state detecting unit are at a limit within which the electric pump can operate appropriately.

7. The vehicle control device according to claim 6, wherein the fourth control mode inhibits engagement of the lock-up engagement element and the shift engagement element until the rotational speed of the mechanical pump becomes greater than or equal to the predetermined operation threshold value.

8. The vehicle control device according to claim 6, wherein the third condition represents a state where the discharge amount of the electric pump is at a limit of discharging the amount necessary for engaging the shift engagement element so as to enable transmission of the rotational driving force from the drive power source via the fluid coupling to a transmission downstream side with the lock-up engagement element in a released state.

9. The vehicle control device according to claim 6, wherein the control unit executes the fourth control mode in a case where a failure of the electric pump is detected.

10. The vehicle control device according to claim 1, further comprising:
    a rise determination unit which determines whether a transient state has passed and the rise of the hydraulic pressure of the hydraulic oil is completed, wherein the transient state is a state from a start of operation of the electric pump until a rise of hydraulic pressure of the hydraulic oil, and
    wherein the control unit determines whether the first condition is satisfied after the rise determination unit has determined that the rise of the hydraulic pressure is completed.

11. The vehicle control device according to claim 10, wherein the rise determination unit calculates an expected time until completion of the rise of the hydraulic pressure of the hydraulic oil based on an elapsed time of a state where both of the mechanical pump and the electric pump are stopped and a temperature of the hydraulic oil, and determines that the rise is completed when the expected time has elapsed.

12. The vehicle control device according to claim 1, wherein the factor influencing the discharge performance of the electric pump is the temperature of the hydraulic oil, and the first condition is a temperature range of the hydraulic oil.

13. The vehicle control device according to claim 1, wherein the factor influencing the discharge performance of the electric pump is voltage of a power supply of the electric pump, and the first condition is a voltage range of the power supply.

14. The vehicle control device according to claim 1, wherein the one or more factors influencing the discharge performance of the electric pump are the temperature of the hydraulic oil and the voltage of the power supply of the electric pump, and the first condition is a range specified by both of the temperature of the hydraulic oil and the voltage of the power supply.

15. The vehicle control device according to claim 1, wherein the factor influencing the discharge performance of the electric pump is temperature of at least one of a driving electric motor of the electric pump and a driver of the driving electric motor, and the first condition is a temperature range of at least one of the driving electric motor and the driver.

16. The vehicle control device according to claim 1, further comprising:
   a rotating electrical machine as the drive power source, wherein
   the control unit controls the transmission of rotational driving force of the rotating electrical machine to a wheel to start a vehicle in a state where the lock-up engagement element is engaged.

17. The vehicle control device according to claim 16, further comprising:
   an engine as the drive power source, wherein
   the input member is selectively connected with the engine via a transmission clutch.

18. The vehicle control device according to claim 2, wherein:
   the drive transmission mechanism comprises a shift engagement element;
   the first control mode permits engagement of both of the lock-up engagement element and the shift engagement element; and
   the second control mode inhibits the engagement of the lock-up engagement element and permits engagement of the shift engagement element.

19. The vehicle control device according to claim 18, wherein the control unit executes a third control mode, wherein the third control mode stops the electric pump after a rotational speed of the mechanical pump has become greater than or equal to a predetermined operation threshold value and executes the second control mode if a predetermined second condition is not satisfied based on the detection result of the state detection unit, wherein the predetermined second condition represents a state where the discharge performance of the electric pump is decreased compared to the first condition for the one or more factors the state of which is detected by the state detecting unit.

20. The vehicle control device according to claim 19, wherein the second condition is a condition specifying a boundary of a predetermined safety region up to a state where the electric pump is at a limit of operating appropriately.

* * * * *